(12) United States Patent
Pal et al.

(10) Patent No.: US 10,296,996 B2
(45) Date of Patent: *May 21, 2019

(54) SYSTEMS AND METHODS FOR PLANNING LOCATION-SENSITIVE PROBABILISTIC BEHAVIOR BASED EVACUATION PATHS

(71) Applicant: Tata Consultancy Services Limited, Mumbai (IN)

(72) Inventors: Arindam Pal, Kolkata (IN); Francesco Parisi, Paola (IT); Venkatramanan Siva Subrahmanian, Potomac, MD (US); Subhra Mazumdar, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 258 days.

This patent is subject to a terminal disclaimer.

(21) Appl. No.: 15/213,877

(22) Filed: Jul. 19, 2016

(65) Prior Publication Data

US 2017/0243316 A1    Aug. 24, 2017

(30) Foreign Application Priority Data

Feb. 23, 2016 (IN) .............................. 201621006304

(51) Int. Cl.
*G06Q 10/10*    (2012.01)
*G06Q 30/02*    (2012.01)
(Continued)

(52) U.S. Cl.
CPC ........... *G06Q 90/205* (2013.01); *G06F 17/11* (2013.01); *G06N 7/005* (2013.01); *G06Q 10/047* (2013.01); *G06Q 50/265* (2013.01); *G06Q 90/20* (2013.01)

(58) Field of Classification Search
CPC .............................. G06Q 50/265; G06Q 90/20
(Continued)

(56) References Cited

U.S. PATENT DOCUMENTS 6,058,387 A * 5/2000 Campbell ................ G06N 5/02
706/11
2001/0027388 A1* 10/2001 Beverina .............. G06Q 20/203
703/22
(Continued)

FOREIGN PATENT DOCUMENTS

EP          2736027 A1    5/2014
WO    WO 2009/038563 A1    3/2009
WO    WO 2013/07574 A1    1/2013

OTHER PUBLICATIONS

Murray-Tuite, P. et al., "Model of Household Trip Chain Sequencing in an Emergency Evacuation", Journal of the Transportation Research Board, 26 pgs., Jan. 2003.
(Continued)

*Primary Examiner* — Jonathan P Ouellette
(74) *Attorney, Agent, or Firm* — Finnegan, Henderson, Farabow, Garrett & Dunner LLP

(57) ABSTRACT

Systems and methods for planning location-sensitive probabilistic behavior based evacuation paths, in a building, from source nodes to sink nodes in a network of routes including a plurality of vertices and edges are disclosed. For example, input parameters including layouts, number of evacuees at each source node, transit time, predetermined time period and maximum capacity associated with each edge and vertex are received. Further, weak evacuation schedules at a state of the evacuees are defined based on the layouts of the building, number of evacuees, transit time and predetermined time period. Furthermore, a strong evacuation schedule is defined based on the weak evacuation schedules and maximum capacity associated with each edge and vertex. Moreover, a mapping is defined from the strong evacuation schedule to the weak evacuation schedules to obtain a probabilistic behavior model. Also, an evacuation path is planned, in real-time, based on the probabilistic behavior model.

13 Claims, 14 Drawing Sheets

(51) Int. Cl.
*G06Q 10/06* (2012.01)
*G06Q 30/06* (2012.01)
*G06Q 90/00* (2006.01)
*G06Q 50/26* (2012.01)
*G06F 17/11* (2006.01)
*G06N 7/00* (2006.01)
*G06Q 10/04* (2012.01)

(58) Field of Classification Search
USPC .................................................. 705/1.1–912
See application file for complete search history.

(56) References Cited

U.S. PATENT DOCUMENTS

| | | | | |
|---|---|---|---|---|
| 2007/0021955 A1* | 1/2007 | Tolone | ............... | G06F 17/5004 703/22 |
| 2008/0046134 A1* | 2/2008 | Bruce | ................. | G01C 21/005 701/1 |
| 2009/0292509 A1* | 11/2009 | Thompson | .......... | G06F 17/5004 703/1 |
| 2009/0306946 A1* | 12/2009 | Badler | ................. | G06N 3/004 703/2 |
| 2010/0057354 A1 | 3/2010 | Chen et al. | | |
| 2010/0164732 A1 | 7/2010 | Wedig et al. | | |
| 2011/0173146 A1* | 7/2011 | Hnatio | .................. | G06Q 10/06 706/14 |
| 2016/0314554 A1* | 10/2016 | Pillac | ................. | G01C 21/3407 |

OTHER PUBLICATIONS

Kim, S. et al., "Evacuation route planning: scalable heuristics" Proceedings of the 15th annual ACM international symposium on Advances in geographic information systems, ACMGIS '07, 8 pgs., Nov. 2007.

* cited by examiner

SYSTEMS AND METHODS FOR PLANNING LOCATION-SENSITIVE PROBABILISTIC BEHAVIOR BASED EVACUATION PATHS

PRIORITY CLAIM

This U.S. patent application claims priority under 35 U.S.C. § 119 to: India Application No. 201621006304 filed on 23 Feb. 2016. The entire contents of the aforementioned application are incorporated herein by reference.

TECHNICAL FIELD

The embodiments herein generally relate to evacuation paths and, more particularly, to systems and methods for planning location-sensitive probabilistic behavior based evacuation paths.

BACKGROUND

Generally, buildings with various capacities need to be evacuated during emergencies, such as fire, terror attack, the earthquake and so on. These emergencies have led to the development of work on building evacuation models in both operations research and other communities. The existing approaches are developed based on the assumption that in an emergency, people do what they are told. However, if you are in a building at location L and an emergency occurs and people are told to move along a given route to an exit e that the people know is further away than the nearest exit e0, then the people move towards the nearest exit e0 instead of the exit e. Also, people may exhibit delay in moving to the exit. Thus, creating a problem for planning an evacuation path during the emergency.

SUMMARY

Embodiments of the present disclosure present technological improvements as solutions to one or more of the above-mentioned technical problems recognized by the inventors in conventional systems.

In one aspect, a computer implemented method for planning location-sensitive probabilistic behavior based evacuation paths, in a building, from source nodes to sink nodes in a network of routes comprising a plurality of vertices and edges there between is disclosed. In an example embodiment, input parameters including layouts of the building, a number of evacuees at each source node, a transit time, a predetermined time period and a maximum capacity associated with each edge and vertex are received. Further, multiple weak evacuation schedules at a state of the evacuees are defined based on the layouts of the building, the number of evacuees, the transit time and the predetermined time period. Each of the multiple weak evacuation schedules is an evacuation schedule to evacuate one or more of the evacuees to the sink nodes in the predetermined time period. Furthermore, a strong evacuation schedule at the state of the evacuees is defined based on the multiple weak evacuation schedules and the maximum capacity associated with each edge and vertex. The strong evacuation schedule is an evacuation schedule to evacuate a plurality of the evacuees to the sink nodes in the predetermined time period. Moreover, a mapping from the strong evacuation schedule to the multiple weak evacuation schedules is defined to obtain a probabilistic behavior model, the probabilistic behavior model represents constraints associated with behavior of the evacuees. Also, an evacuation path for the building is planned, in real-time, based on the probabilistic behavior model.

In another aspect, a system for planning location-sensitive probabilistic behavior based evacuation paths, in a building, from source nodes to sink nodes in a network of routes including a plurality of vertices and edges there between is disclosed. In an example, the system includes one or more processors and a memory communicatively coupled to the processors. Further, the memory includes an evacuation path planning module. In an example implementation, the evacuation path planning module receives input parameters including layouts of the building, a number, of evacuees at each source node, a transit time, a predetermined time period and a maximum capacity associated with each edge and vertex. Further, the evacuation path planning module defines multiple weak evacuation schedules at a state of the evacuees based on the layouts of the building, the number of evacuees, the transit time and the predetermined time period. Each of the multiple weak evacuation schedules is an evacuation schedule to evacuate one or more of the evacuees to the sink nodes in the predetermined time period. Furthermore, the evacuation path planning module defines a strong evacuation schedule at the state of the evacuees based on the multiple weak evacuation schedules and the maximum capacity associated with each edge and vertex. The strong evacuation schedule is an evacuation schedule to evacuate a plurality of the evacuees to the sink nodes in the predetermined time period. Moreover, the evacuation path planning module defines a mapping from the strong evacuation schedule to the multiple weak evacuation schedules to obtain a probabilistic behavior model, the probabilistic behavior model represents constraints associated with behavior of the evacuees. Also, the evacuation path planning module plans, in real-time, an evacuation path for the building based on the probabilistic behavior model.

It is to be understood that both the foregoing general description and the following detailed description are exemplary and explanatory only and are not restrictive of the invention, as claimed.

BRIEF DESCRIPTION OF THE DRAWINGS

The embodiments herein are better understood from the following detailed description with reference to the drawings, in which.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The term "people", "person", and "evacuees" are used interchangeably throughout the document. Further, the term "node" and "vertex" are used interchangeably throughout the document.

Figure 1:
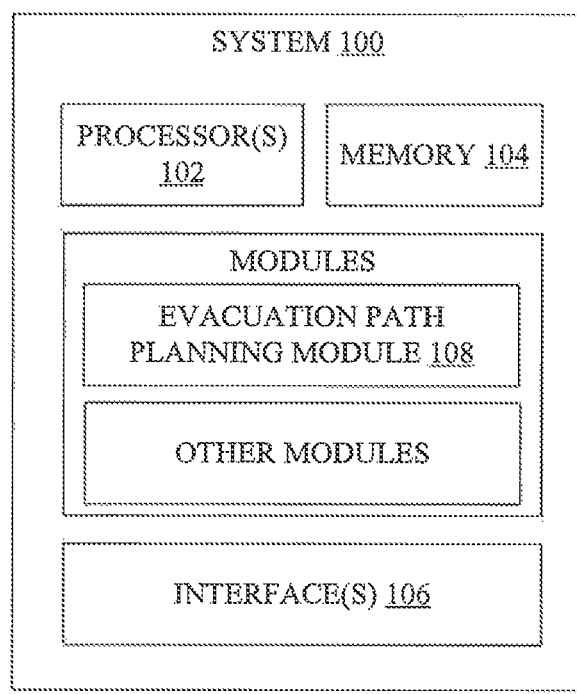
FIG. 1 illustrates a block diagram of a system for planning location-sensitive probabilistic behavior based evacuation paths, according to an embodiment of the present disclosure.

FIG. 1 illustrates a block diagram of a system 100 for planning location-sensitive probabilistic behavior based evacuation paths, according to an embodiment of the present disclosure. As shown in FIG. 1, the system 100 includes one or more processor(s) 102 and a memory 104 communicatively coupled to each other. The system 100 also includes interface(s) 106. Further, the memory 104 includes modules, such as an evacuation path planning module 108 and other modules. Although FIG. 1 shows example components of the system 100, in other implementations, the system 100 may contain fewer components, additional components, different components, or differently arranged components than depicted in FIG. 1.

The processor(s) 102 and the memory 104 may be communicatively coupled by a system bus. The processor(s) 102 may include circuitry implementing, among others, audio and logic functions associated with the communication. The processor(s) 102 may include, among other things, a clock, an arithmetic logic unit (ALU) and logic gates configured to support operation of the processor(s) 102. The processor(s) 102 can be a single processing unit or a number of units, all of which include multiple computing units. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions and data stored in the memory 104.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 106 may include a variety of software and hardware interfaces, for example, interfaces for peripheral device(s), such as a keyboard, a mouse, an external memory, and a printer. The interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 106 may include one or more ports for connecting the system 100 to other devices or systems.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 104, may store any number of pieces of information, and data, used by the system 100 to implement the functions of the system 100. The memory 104 may be configured to store information, data, applications, instructions or the like for enabling the system 100 to carry out various functions in accordance with various example embodiments. Additionally or alternatively, the memory 104 may be configured to store instructions which when executed by the processor(s) 102 causes the system 100 to behave in a manner as described in various embodiments. The memory 104 includes the evacuation path planning module 108 and other modules. The module 108 and other modules include routines, programs, objects, components, data structures, etc., which perform particular tasks or implement particular abstract data types. The other modules may include programs or coded instructions that supplement applications and functions of the system 100.

In an example embodiment, the evacuation path planning module 108 plans location-sensitive probabilistic behavior based evacuation paths, in a building, from source nodes (e.g., a node at which people are located) to sink nodes (e.g., exits) in a network of routes including a plurality of vertices and edges therebetween. In this example embodiment, the evacuation path planning module 108 receives input parameters comprising layouts of the building, a number of evacuees at each source node, a transit time, a predetermined time period and a maximum capacity associated with each edge and vertex and the like. For example, the layouts of the building include floor plans of the building or building graphs.

Further, the evacuation path planning module 108 defines multiple weak evacuation schedules at a state of the evacuees based on the layouts of the building, the number of evacuees, the transit time and the predetermined time period. The state of the evacuees may be determined, in real-time, based on sensors in the building, global positioning system based mobile phones associated with the evacuees and the like. In an example implementation, the evacuation path planning module 108 solves an integer linear program on the layouts of the building, the number of evacuees, the transit time and the predetermined time period. Further, the evacuation path planning module 108 defines the weak evacuation schedules at the state of the evacuees upon solving the integer linear program on the layouts of the building, the number of evacuees, the transit time and the predetermined time period. For example, each of the weak evacuation schedules is an evacuation schedule to evacuate one or more of the evacuees to the sink nodes in the predetermined time period. The predetermined time period includes a deadline to evacuate the evacuees to the sink nodes. In other words, the weak evacuation schedule is a schedule which people generally tend to follow based on people's intuition during an emergency situation and in this case, the schedule do not take into account the capacity of each edge or vertex.

Furthermore, the evacuation path planning module 108 defines a strong evacuation schedule at the state of the evacuees based on the weak evacuation schedules and the maximum capacity associated with each edge and vertex. In an example implementation, the evacuation path planning module 108 solves an integer linear program on the weak evacuation schedules and the maximum capacity associated with each edge and vertex. Further, the evacuation path planning module 108 defines the strong evacuation schedule at the state of the evacuees upon solving the integer linear program on the weak evacuation schedules and the maximum capacity associated with each edge and vertex. For example, the strong evacuation schedule is an evacuation schedule to evacuate a plurality of the evacuees to the sink nodes in the predetermined time period.

Moreover, the evacuation path planning module 108 defines a mapping from the strong evacuation schedule to the multiple weak evacuation schedules to obtain a probabilistic behavior model. For example, the probabilistic behavior model represents constraints associated with behavior of the evacuees. In this example, the probabilistic behavior model includes a delayed behavior model and/or a nearest-exit behavior model. The delayed behavior model may represent delayed behavior of the evacuees following the strong evacuation schedule with multiple probabilities. The nearest-exit behavior model may represent behavior of the evacuees moving towards the nearest exit to the source node where they are located.

Also, the evacuation path planning module 108 plans, in real-time, an evacuation path for the building based on the probabilistic behavior model. The planned evacuation path may represent an evacuation path with a probability distribution over the weak evacuation schedules which provide an expected number of evacuees evacuated when the strong evacuation schedule is provided. In an example, the evacuation path planning module 108 divides the building into multiple sub-regions. The evacuation path planning module 108 further plans the evacuation path for each of the multiple sub-regions based on the probabilistic behavior model. The evacuation path planning module 108 merges the evacuation path for each of the sub-regions to obtain the evacuation path for the building.

Figure 2A:
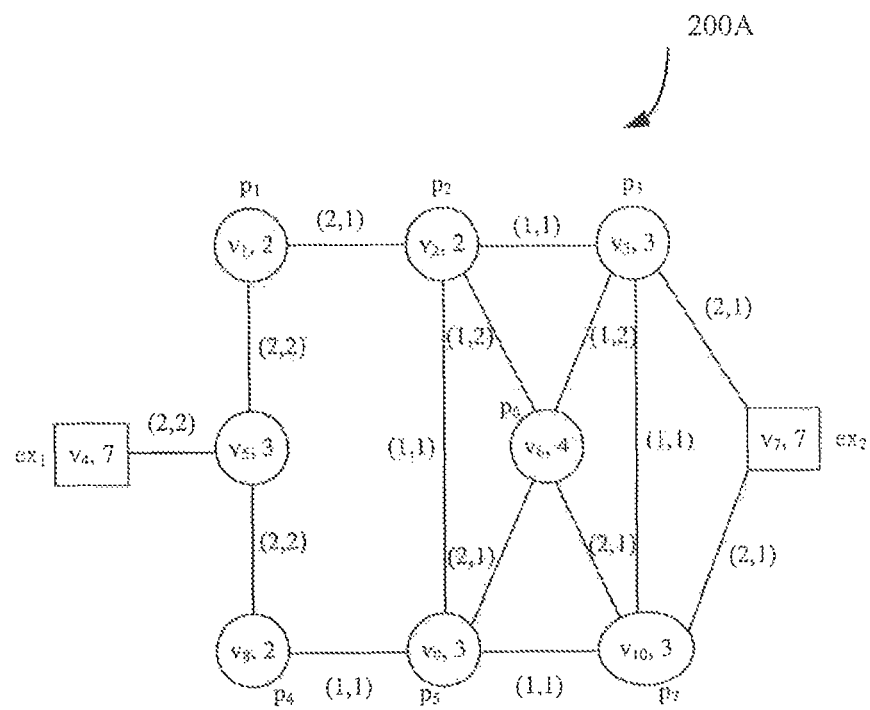
FIG. 2A illustrate a layout of a building, according to an embodiment of the present disclosure.

FIG. 2A illustrates a layout 200A of a building (i.e., a building graph), according to an embodiment of the present disclosure. For example, a building graph G is a tuple (V, E, EX, c, d) where V is the set of vertices, $E \subseteq V \times V$ is the set of edges, c, d: $E \cup V \rightarrow Z$ are a capacity function and a travel time function, respectively, $EX \subset V$ is a set of exits, c(v) and c(e) represent a capacity of a vertex v and an edge e, respectively and d(e) is a time required to travel from one end of the edge e to other end, even if the edge is at full capacity. In an example, the following conditions are considered for the building graph G.

i. d (v)=0 for all vertices $v \in V$, i.e., time needed to traverse a vertex is negligible. If not, a location previously modeled with a vertex v can instead be modeled by means of a new edge e whose endpoints are appropriately connected with the vertices adjacent to v and such that the capacity c(e) is greater than zero.

ii. c (v)≥|P| for all the vertices $v \in EX$, i.e., an exit has a capacity sufficient to contain all people. If a person reaches an exit, then the person is safe. For example, P is to denote the set of people in a building that must be evacuated, T={0, 1 ..., $t_{max}$} is a set of all time points.

In the building graph 200A, square nodes denote exits, node labels denote name and capacity of a node and edge labels denote capacity and travel time for an edge. The capacity and travel time for edge e is shown by the pair (c (e), d (e)) next to e. Further, vertex labels (v, c (v)) indicate vertex name and capacity. Furthermore, persons p1, p2, p3, p4, p5, p6, p7 are located on vertices v1, v2, v3, v8, v9, v6, v10, respectively. The exits ex1 and ex2 are situated on v4 and v7, respectively.

Further as shown in FIG. 2A, at state s and time t=0, p1, p2, p3, p4, p5, p6, p7 are located at vertices v1, v2, v3, v8, v9, v6, v10 respectively. For example, a state is a mapping s: $P \rightarrow V \cup E$ indicating where each person is at a fixed time point. At a given time, a person can be at a vertex or on an edge connecting two vertices. For instance, s (p1)=v1 and s (p7)=v10. Suppose p1 starts moving from v1 at t=0 toward v5. For the edge e=(v1, v5), travel time d (e)=2. At t=1, the person may be on e (i.e., s (p1)=e at t=1). At t=2, the person may reach the vertex v5 or still stay on the edge e.

Further, multiple weak evacuation schedules (wes or WES) are defined at a state of the evacuees based on the layouts of the building, the number of evacuees, and the transit time. For example, an evacuation schedule is a sequence of states capturing positions of the people for each $t \in T$. In this example, evacuation planning may start at time 0 and end by $t_{max}$. As a WES may violate capacity constraints and not get all people to an exit by $t_{max}$. Therefore, an evacuation schedule (es) for person p is indicated by $es_p = s_1(p), \ldots, s_{t_{max}}(p)$ where $s_t$ is the state es (t) for $t \in T$ and $es_{p\,(t)}$ denotes the state of person p at time t with reference to the es.

For example, a weak evacuation schedule (wes) is a mapping wes: T→ST (let ST be a set of all possible states) such that:

1. $\forall p \in P$, if wes(t)=s' and s'(p)=$v_1$ and wes(t+1)=s", then one of the following is true: a) s"(p)=$v_1$, b)$\exists e=(v_1, v_2) \in E$ such that s"(p)=e, c)$\exists e=(v_1, v_2) \in E$ such that s"(p)=$v_2$. That is if a person is in a vertex $v_1$ at time t, then at time t+1 the person stays in $v_1$ or moves to an edge incident on $v_1$ or an adjacent vertex $v_2$.
2. $\forall p \in P$, if wes(t)=s" and s"(p)=e=$(v_1, v_2) \in E$ and wes (t+1)=s", then one of the following is true: (a) s" (p)=e, (b) s" (p)=$v_1$, (c) s"(p)=$v_2$. That is, if a person is on an edge e=$(v_1, v_2)$ at time t, then at time t+1 the person stays in e or moves to one of the vertices incident on e.
3. $\forall p \in P$, $\forall e=(v_1, v_2) \in E$, if wes(t)=s' and s' (p)=$v_1$ then wes(t+k)=s" and s" (p)=$v_2$ only if d(e)≤k. That is, if a person is in $v_1$ at time t, then the person can reach an adjacent vertex $v_2$ only if travel time d (e) elapses.
4. $\forall p \in P$, $0 \le t' < t'' \le t_{max}$, if wes (t')=s' and s"(p)$\in$EX and wes t"=s" then s"(p) s'(p). That is, if a person reaches an exit at some time point, then the person cannot go back to other places leaving the exit.

A below example table shows a wes$^1$ for the building graph 200A of FIG. 2A. In the table, each column (except the leftmost) is a state. Rows report the evacuation schedule wes$^1$ p for person p. Note that between t=1 and t=2, p3, p5 and p6 are crossing the edge (v10, v7) whose capacity is 2; thus violating a capacity constraint. Although it is not required by wes, all evacuees reach an exit (at time point t=4) with reference to wes$^1$. Further, a wes$^2$ in a table 2 differs from wes$^1$ in following:
(i) p2 as well as p5 and p6 move with a delay of one time point, while p7 immediately reach exit v7.
(ii) p1 does not reach any exit but passes through v2 and waits at v9.
(iii) The capacity constraint of edge (v10, v7) is not violated as only p5 and p6 are crossing this edge at the same time.

TABLE 1

Weak evacuation schedule wes$^1$

| Person p | wes$_p^1$(0) | wes$_p^1$(1) | wes$_p^1$(2) | wes$_p^1$(3) | wes$_p^1$(4) |
|---|---|---|---|---|---|
| p1 | v1 | (v1, v5) | v5 | v5, v4 | v4 |
| p2 | v2 | v3 | v7 | v7 | v7 |
| p3 | v3 | v10 | v7 | v7 | v7 |
| p4 | v8 | v8, v5 | v5 | v5, v4 | v4 |
| p5 | v9 | v10 | v7 | v7 | v7 |
| p6 | v6 | v10 | v7 | v7 | v7 |
| p7 | v10 | v6 | v6, v3 | v3 | v7 |

TABLE 2

Weak evacuation schedule wes$^2$

| Person p | wes$_p^2$(0) | wes$_p^2$(1) | wes$_p^2$(2) | wes$_p^{12}$(3) | wes$_p^2$(4) |
|---|---|---|---|---|---|
| p1 | v1 | v1, v2 | v2 | v2, v9 | v9 |
| p2 | v2 | v2 | v3 | v7 | v7 |
| p3 | v3 | v10 | v7 | v7 | v7 |
| p4 | v8 | v8, v5 | v5 | v5, v4 | v4 |
| p5 | v9 | v9 | v10 | v7 | v7 |
| p6 | v6 | v6 | v10 | v7 | v7 |
| p7 | v10 | v7 | v7 | v7 | v7 |

Furthermore, a strong evacuation schedule is defined at the state of the evacuees based on the multiple weak evacuation schedules and the maximum capacity associated with each edge. In other words, a wes es is said to be a strong evacuation schedule (ses or SES) if the wes es satisfies the following additional constraints:

i. $\forall t \in T$, $\forall v \in V$, if es (t)=s' then |{p|p$\in$P, s' (p)=v}|≤c (v). The constraint indicates that a number of people in a vertex cannot exceed the capacity at any time.

ii. $\forall t \in T$, $\forall e \in E$, if es (t)=s' then |{p|p$\in$P, s' (p)=e}|≤c (e), i.e., the number of people in an edge cannot exceed the capacity.

iii. $\forall p \in P$, es ($t_{max}$)=s such that s (p)$\in$EX, i.e., every person must reach an exit by time $t_{max}$.

An example SES es is shown in a table 3 below. In this table, the capacity constraints of all vertices and edges of the building graph 200A are satisfied.

TABLE 3

Strong evacuation schedule es

| Person p | es$_p$(0) | es$_p$(1) | es$_p$(2) | es$_p$(3) | es$_p$(4) |
|---|---|---|---|---|---|
| p1 | v1 | v1, v5 | v5 | v5, v4 | v4 |
| p2 | v2 | v3 | v7 | v7 | v7 |
| p3 | v3 | v7 | v7 | v7 | v7 |
| p4 | v8 | v8, v5 | v5 | v5, v4 | v4 |
| p5 | v9 | v10 | v7 | v7 | v7 |
| p6 | v6 | v10 | v7 | v7 | v7 |
| p7 | v10 | v7 | v7 | v7 | v7 |

In an example implementation, the multiple weak evacuation schedules and the strong evacuation schedule are defined by solving an integer linear program. In this example implementation, the multiple Weak evacuation schedules is defined upon solving the integer linear program on the layouts of the building, the number of evacuees, the predetermined time period and the transit time. Further, the strong evacuation schedule is defined upon solving the integer linear program on the multiple weak evacuation schedules and the maximum capacity at each edge and vertex.

In order to solve an integer linear program, the building graph G is simplified by considering edges e=(v,w) with travel time d(v,w)>1 as three edges by introducing 2 virtual nodes e' and e". The e' is a new vertex (on edge e) that can be reached in one time unit from v. Similarly, e" is the location on edge e that can reach w in one time unit. Thus, d(v,e')=d((e", w))=1, and d(e',e")=d((v, w))−2 (if d((v, w))=2 then d(e',e")=0 indicating that the transition between the two virtual vertices can be instantaneous. A variable $x_{v, t}$ for each (v, t)$\in$V×T, indicating us the number of people at v at time t. Similarly, $x_{v, w, t}$ denotes the net number of people that leave v at time t and reach w at time t+1 [when d ((v,w))=1]. If d((v,w))≥2, $x_{v,e,t}$ denotes the net number of people who have left v along edge e at time t and are on e' at time t+1, $x_{e,t}$ denotes the net number of people who have left e' at time t and reach e" at time t+d(e)−2, and $x_{e,w,t}$ is the net number of people who have left e" at time t and are on the way towards w that may be reached at time t+1.

In an example table below, a linear program for WES (LPW) (G) is used to denote a set of constraints (1)-(8), and a linear program for SES LPS (G) is used to denote a set of constraints (9)-(11). The solutions of LPW (G) and LPS* (G)=LPW (G)$\cup$LPS (G), respectively, capture a set of all wes and ses, respectively, of the building graph G.

$$x_{v,t+1} = x_{v,t} - \sum_{\forall e=(v,w)\in E} x_{v,e,t} - \sum_{\forall e=(v,w)\in E} x_{v,w,t} + \sum_{\forall e=(w,v)\in E} x_{e,v,t} + \sum_{\forall e=(w,v)\in E} x_{w,v,t} \quad (1)$$

$$\forall v \in V, t \in [0, t_{max} - 1]$$

$$x_{e',t+1} = x_{e',t} - x_{e,t} + x_{v,e,t} \; \forall e=(v,w) \in E, \forall t \in [0, t_{max}-1] \quad (2)$$

$$x_{e'',t+1} = x_{e'',t} - x_{e,w,t} + x_{v,e,t} + x_{e,t} - d(e) + 2 \quad (3)$$

$$x_{v,w,t} = 0 \; \forall e=(v,w) \in E \; s.t. \; d(e) > 1, \forall t \in [0, t_{max}-1] \quad (4)$$

$$x_{e,t} = 0 \; \forall e=(v,w) \in E \; s.t. \; d(e) = 1, \forall t \in [0, t_{max}-1] \quad (5)$$

$$x_{v,t1} \geq x_{v,t2}, \forall v \in EX, t_1, t_2 \in [0, t_{max}], t_1 \geq t_2 \quad (6)$$

$$x_{v,t}, x_{e',t}, x_{e'',t} \in N, \forall e \in E, v \in V, t \in [0, t_{max}] \quad (7)$$

$$x_{v,w,t}, v_{v,e,t}, x_{e,w,t}, x_{e,t} \in Z, \forall e \in E, v \in V, t \in [0, t_{max}] \quad (8)$$

$$0 \leq x_{v,t} \leq c(v), \forall v \in V, t \in [0, t_{max}] \quad (9)$$

$$0 \leq x_{e',t} + x_{e'',t} \leq c(e), \forall e \in E, t \in [0, t_{max}] \quad (10)$$

$$\sum_{v \in EX} x_v, t_{max} \geq |P| \quad (11)$$

For example, in the above table, constraint (2) indicates that a number of people at e' at time t+1 equals the number at e' at time t minus the number (i.e. $x_{e,t}$) who left e' for e" at time t plus the number who arrived ($x_{v,e,t}$) from v. The constraint (1) indicates that a number of persons at a vertex v at time t+1 equals a number of people at v at time t minus a number of people that moved from v at time t to an adjacent vertex or an edge plus a number of people that came from an adjacent vertex or an edge to v at time t. The constraint (3) applies to virtual vertex e" and can be read analogously by noting that moving from e' to e" takes d(e)−2 time. Thus, the constraint (3) indicates that the number of people at e' at time t+1 equals a number of people at e" at time t minus a number of people that moved from e to w at time t plus a number of people that moved from e' to e" at time t−d(e)+2. Next, the constraint (4) says that no person can move from v to w, if the travel time of the edge e=(v,w) is greater than 1. Similarly, constraint (5) says that no person can move from e' to e" if the travel time of the edge e=(v,w) is 1. Finally, the constraint (6) says that the number of people that reaches an exit never decreases if a person reaches an exit at some time $t_1$, the person cannot move out of that exit at a later time $t_2$. The constraints (7) and (8) ensure that $x_{v,t}$, $x_{e',t}$ and $x_{e'',t}$ are positive integers and $x_{v,w,t}$, $x_{v,e,t}$, $x_{e,w,t}$ and $x_{e,t}$ are integers.

Further, following propositions state that a set of solutions of LPW (G) corresponds to a set of weak and strong evacuation schedules.

1) Every wes∈W corresponds to a solution σ of LPW (G) such that σ($x_{v,t}$) is equal to the number of people on vertex v at time t according to wes (t) and σ($x_{e',t}$)+σ($x_{e'',t}$) is equal to the number of people on edge e at time t according to wes (t), where σ (x) is denoted as the value assigned by a solution σ of LPW (G) to variable x. Thus indicating that every $wes_i$ corresponds to a solution $σ_i$.

2) Every solution σ of LPW (G) corresponds to the set of WESs W (σ) consisting of the WESs wes∈W such that ∀t∈T, v∈V, e∈E it holds that wes(t)=s and |{p∈P|s(p)=v}|=σ($x_{v,t}$) and |{p∈P|s(p)=e}|=σ($x_{e',t}$)+σ($x_{e'',t}$). Thus stating that every solution $σ_i$ of LPW (G) corresponds to a set of WESs that are equivalent.

Further, the constraints (9)-(11) of the above table are used to capture the meaning of strong evacuation schedules. In fact, the constraints (9) and (10), respectively, say that the vertex and edge capacities cannot be exceeded at any time t. Note that the number of people on edge e at time t is given by summing the number of people on the (virtual) vertices e' and e" associated with e. Finally, the constraint (15) says that every person in P must reach some exit by time $t_{max}$. The following propositions mirror those stated above for wes, and states the correspondence between ses and solutions of LPS*(G)=LPW (G)∪LPS(G).

1) Every ses es∈S corresponds to a solution σ of LPS* (G)=LPW (G)∪LPS(G) such that (i) σ($x_{v,t}$) is equal to a number of people on vertex v at time t according to es(t), and (ii) σ($x_{e',t}$)+σ($x_{e'',t}$) is equal to a number of people on edge e at time t according to es(t).

2) Every solution σ of LPW (G)∪LPS(G) corresponds to the set of SESs S (σ) consisting of the SESs es∈S such that ∀t∈T, v∈V, e∈E it holds that es(t)=s and |{p∈P|s(p)=v}|=σ($x_{v,t}$) and |{p∈P|s(p)=e}|=σ($x_{e',t}$)+σ($x_{e'',t}$).

Furthermore, a behavior model which is a function β: S→PW that associates every SES with a pdf over the set of all WESs is defined. For example, a pair (es, β (es)) indicates a probability that if users follow SES es, then the users instead end up following the WESs in β (es) with corresponding probabilities. In other words, a behavior model β maps an SES es onto a set {$wes_1$ ... $wes_k$} of WESs with probability $α_1$ ... $α_k$, respectively with $α_i$>0. Further, a set of constraints $F_β$ are used to define the behavior models. The constraints are as follows:

For all 1≤i≤k, $σ_i$ of $LPW^i$(G) corresponds to equivalent WES $wes_i$, where k copies of LPW(G) include $LPW^1$ (G), ..., $LPW^k$(G).

σ of LPS*(G)=LPW (G)∀LPS (G) corresponds to equivalent SES es,

If $Y_i$ is a vector of the variables in $LPW^i$ (G), then $σ_i$ ($Y_i$)=$f_i$ (σ(X)) where X is a vector of variables in LPS*(G) and $f_i$ is a function. Basically, $f_i$ maps a solution of LPS*(G) corresponding to es to a solution of $LPW^i$ (G) corresponding to $wes_i$.

Figure 4:
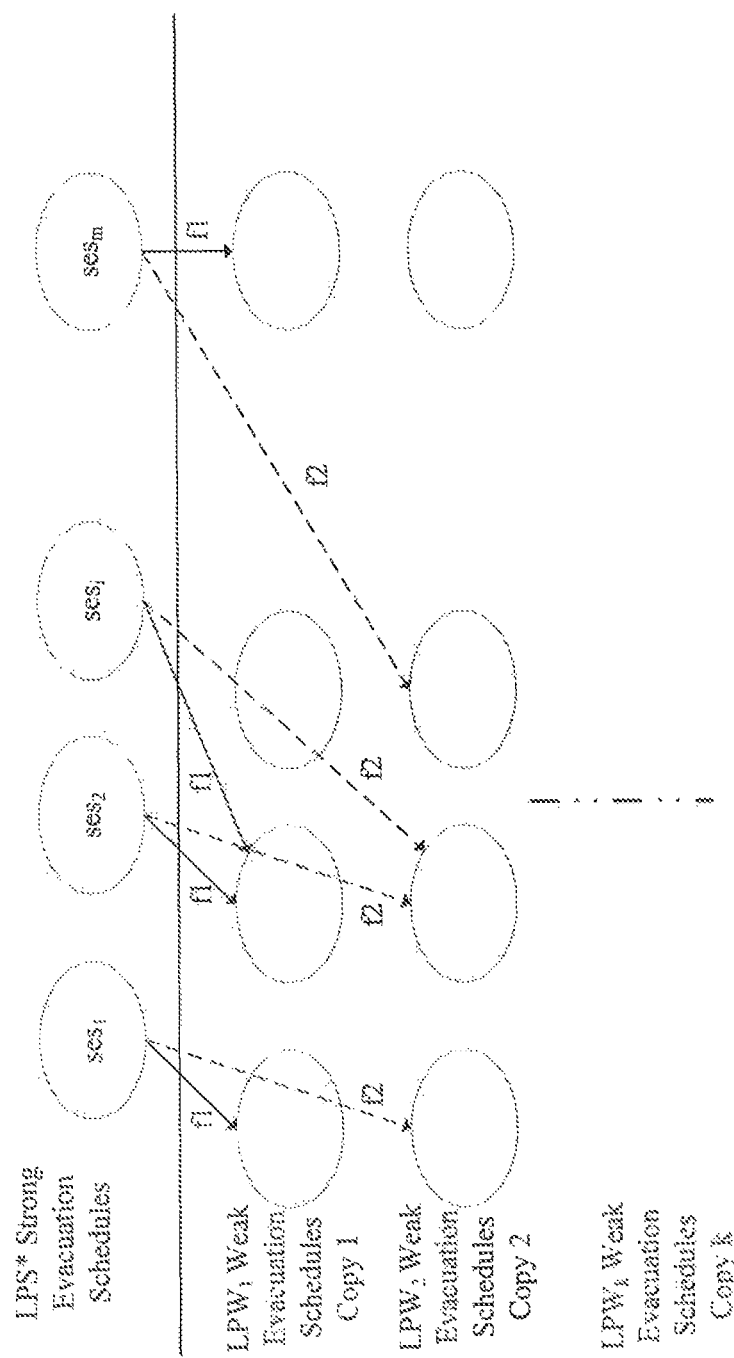
FIG. 4 illustrates mapping between weak and strong evacuation schedules, in accordance with an embodiment of the present disclosure.

FIG. 4 illustrates mapping between weak and strong evacuation schedules, in accordance with an embodiment of the present disclosure. FIG. 4 shows k copies of LPW that generate set {$wes_1$, ..., $wes_k$} of weak evacuation schedules. LPS* generates a set of all strong evacuation schedules. The function $f_1$ maps the set of all strong evacuation schedules to the first copy of weak evacuation schedules as shown via the bold arrows. The function $f_2$ maps the set of all strong evacuation schedules to the second copy of weak evacuation schedules as shown via the dashed arrows. Thus, the $f_i$'s map the set of strong evacuation schedules to the set of weak evacuation schedules, assigning a probability in each case. Zero probability mapping are not shown in FIG. 4.

In an example, the behavior models are expressed via the set $F_β$ of constraints having the following syntax.

Syntax for behavior models: Given a building graph G, a vector X of variables in LPS*(G), vectors $Y_i$ (i∈[1 ... k]) of variables in i-th copy $LPW^i$(G) of LPW (G), and a vector $z_1$, ..., $z_k$ of variables, $F_β$ is the set of constraints having the following form:

$Y_i$=$f_i$(X), ∀i∈[1, k]

$z_i$=$f_i$'(X), ∀i∈[1, k]

$\sum_{i=1}^{k} z_i = 1$ $z_i$≥0, ∀i∈[1, k]

where $f_i(X)$ and $f_x'$ are (possibly non-linear) combinations of variables in X.

For example, the last two constraints ensure that the value assigned to variables $z_1 \ldots z_k$ represent probabilities $\alpha_1 \ldots \alpha_k$. The first constraint ensures that solutions corresponding to SESs es are mapped to solutions corresponding to each $wes_i$ via some function $f_i$. The second constraint ensures that the probability calculation ensures that $wes_i$'s probability is $\alpha_i$. In this example, set $F_\beta$ encodes behavior model $\beta$: SES→PWES if for each pair (es, $\omega=\beta$ (es)) and for each $wes_i \in$ WES, there is a solution $\theta$ of $F_\beta$ such that $\theta$ coincides with solution $\sigma$ of LPS*(G) on variables X (that is, for each variable x in X, it holds that $\theta(x)=\sigma(x)$);

$\theta$ coincides with solution $\sigma_i$ of LPW$^i$(G) on variables $Y_i$;

$\theta(z_i)=\omega(wes_i)=\alpha_i$.

Example behavior models include a delayed behavior model and a nearest-exit behavior model. In an example, given an SES es as a value assignment for the variable in vector X. Associated with the SES es are k WESs $wes_1, \ldots, wes_k$, represented as value assignments for variables $Y_1, \ldots, Y_k$. Assume the delayed behavior model indicates that everyone follows WES $wes_i$ with a delay of $\tau_i$ with probability $\alpha_i$. That is, $\beta$ is such that for a given es, a pdf over the k WESs $wes_i$ assigning probability $\alpha_i$, for i=1 ... k is obtained. In this case, time interval [0, $t_{max}$] is divided into [0, $\tau_i$-1] and [$\tau_i$, $t_{max}$]. A first set of constraints in a table below considers the [0, $\tau_i$-1] time interval. For instance, the constraint $y_{v,t,i}=x_{v,0}$ for $t \in [0, \tau_i-1]$ indicates that the number of people at vertex v at time t according to $wes_i$ is the same as the number of people at vertex v according to the SES es at time 0. This is because the delay of $\tau_i$ time units has not finished yet. The second set of constraints in the table below considers the [$\tau_i$, tmax] time interval. For instance, the constraint $y_{v,t,i}=x_{v,t-\tau_i}$ says that a number of people at vertex v at time t according to $wes_i$ is the same as a number of people at v according to es at time $t-\tau_i$, that is $\tau_i$ time points before t. Finally, constraints $z_i=\alpha_i$ specify the probabilities of WESs.

$F_\beta$ for delayed behavior model—

$$y_{v,t,i}=x_{v,0} \forall v \in V, t \in \{0, \ldots, \tau_i-1\}, i \in [1,k]$$

$$y_{e',t,i}=x_{e',0} \forall e \in E, t \in \{0, \ldots, \tau_i-1\}, i \in [1,k]$$

$$y_{e'',t,i}=x_{e'',0} \forall e \in E, t \in \{0, \ldots, \tau_i-1\}, i \in [1,k]$$

$$y_{v,t,i}=x_{v,t-\tau_i} \forall v \in V, t \in \{\tau_i, \ldots, t_{max}\}, i \in [1,k]$$

$$y_{e',t,i}=x_{e',t-\tau_i} \forall e \in E, t \in \{\tau_i, \ldots, t_{max}\}, i \in [1,k]$$

$$y_{e'',t,i}=x_{e'',t-\tau_i} \forall e \in E, t \in \{\tau_i, \ldots, t_{max}\}, i \in [1,k]$$

$$z_i=\alpha_i \forall i \in [1,k]$$

For example, given a strong evacuation schedule es, the nearest exit behavior model (NEBM) indicates that people follow the paths suggested by es with probability $\alpha$, and follow the shortest paths from the vertices on which they are present to the nearest exits with probability $1-\alpha$. In other words, when the system generates a suggested schedule, people follow that schedule with probability $\alpha$ while others head for the nearest exit with probability $(1-\alpha)$. Again, determining a can be a challenge, however, $\alpha$ can be obtained from a series of regular evacuation drills where it is measured how many people go the nearest exist even if the people are told to go elsewhere and how many followed instructions and went to the exit the schedule told to go to, even if it is further away.

$F_\beta$ for nearest exit behavior model—

$$y_{v,t,1}=x_{v,t} \;\forall\; v \in V, t \in \{0, \ldots, t_{max}\}$$

$$y_{e',t,1}=x_{e',t} \;\forall\; e \in E, t \in \{0, \ldots, t_{max}\}$$

$$y_{e'',t,1}=x_{e'',t} \;\forall\; e \in E, t \in \{0, \ldots, t_{max}\}$$

$$y_{vj,t,2}=y_{vj,t-1,2}+\sum_{vb \in V, t=T(v_b,v_j)} x_{vb,0}$$

$$\forall\; v_j \in V \setminus EX, t \in \{0, \ldots, t_{max}\}$$

$$y_{vj,t,2}=y_{vj,t-1,2}+\sum_{vb \in V, t=T(v_b,v_j)} x_{vb,0}$$

$$\forall\; v_j \in EX, t \in \{0, \ldots, t_{max}\}$$

$$y_{e',t,2}=\sum_{vb \in V, e=(v_j,w) \in E, t=T(v_b,v_j)+1} x_{vb,0}$$

$$\forall\; e \in E\; s.t.\; d(e)>1, t \in \{0, \ldots, t_{max}\}$$

$$y_{e'',t,2}=\sum_{vb \in V, e=(v_j,w) \in E, t=T(v_b,v_j)+d(e)-1} x_{vb,0}$$

$$\forall\; e \in E\; s.t.\; d(e)>1, t \in \{0, \ldots, t_{max}\}$$

$$z_1=\alpha$$

$$z_2=1-\alpha$$

In the above table, for each vertex $v \in V$, let ex (v) denote the exit nearest to v. Furthermore, let $\Pi(v)=(v_1=v, v_2 \ldots v_{n_v-1}, v_n)$ be a shortest path from a vertex $v=v_1$ to the nearest exit $ex(v_1)$. There may be several shortest paths from a given vertex v to an exit, but it is assumed that one of the shortest path is chosen and returned by $\Pi(v)$. As an example of shortest path, considering vertex $v_1$ of FIG. 1, the travel time of the path $\pi_1=(v_1, v_5, v_4)$ to the exit $ex_1=v_4$ is 4, while the travel time of the path $\pi_2=(v_1, v_2, v_3, v_7)$ to the exit $ex_2=v_7$ is 3. Hence, the shortest path for $v_1$ is $\Pi(v_1)=\pi_2$ and the nearest exit is ex ($v_1$) is $ex_2$.

In the above table, $F_\beta$ consists of two groups of constraints. The first group (first three constraints) of constraints corresponds to a weak evacuation schedule $wes_1$ which indicates that people move in accordance with the evacuation plan suggested. The second group of constraints (all the remaining ones) corresponds to a weak evacuation schedule $wes_2$ which indicates that people move towards the closest exit. The first group consists of the first three constraints in $F_\beta$ which say that the number of people on vertices v (resp., e', e'') at time t according to $wes_1$ is equal to the number of people on v (resp., e' and e'') at the same time according to the given strong evacuation schedule es.

The second group of constraints in $F_\beta$ regards $wes_2$ and consists of constraints 4 through 7. Specifically, the fourth constraint in $F_\beta$ indicates that the number of people on vertex v j at time t, according to $wes_2$, is equal to the sum of the number of people $x_{v_b}$, 0 that at time 0 are on any vertex $v_b$ such that there is shortest path $\Pi(v_b)$ starting in $v_b$ and reaching v j at time T ($v_b$, v j) equal to t. The fifth constraint is similar to the previous one but regards vertices v $j \in EX$ and thus the number of people on these vertices takes into account also people that reached the exit at previous time points. The sixth and seventh constraints in $F_\beta$ concern virtual vertices e' and e'', with e=(v j, when d (e)>1. Assume that these vertices can be reached in 1 and d (e)−1 time points starting from v j. Thus, the sixth (seventh) constraint in $F_\beta$ says that the number of people on e' (resp., e'') at time t is equal to the sum of the number of people $x_{v_b}$,0 that was at time 0 on any vertex $v_b$ such that there is shortest path $\Pi(v_b)$ starting in $v_b$ and reaching e (resp., e″) at time t equal to $T(v_b, vj)+1$ (resp., $T(v_b, vj)+d(e)-1$), where e is of the form (v j, w). We note that the constraints for $e^t$ and $e^{t\prime\prime}$ are not needed if d (e)=1 as in this case no person can reside on e. Finally, the last two constraints in $F_\beta$ say that $wes_1$ and $wes_2$ are assigned the probability $\alpha$ and 1−$\alpha$, respectively.

Figure 2B:
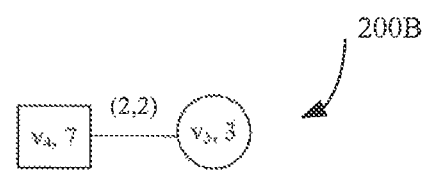
FIGS. 2B-2E illustrate various exit graphs of the building, according to an embodiment of the present disclosure.
Figure 2C:
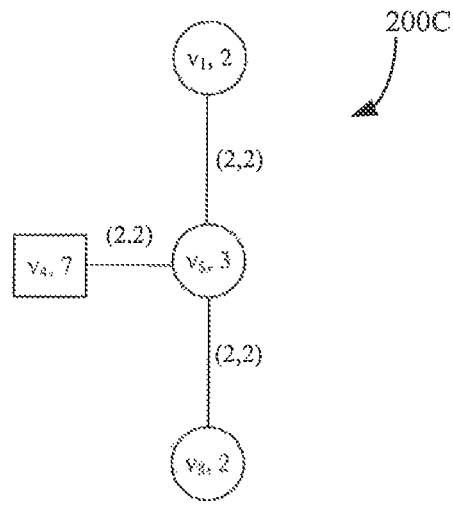
Figure 2D:
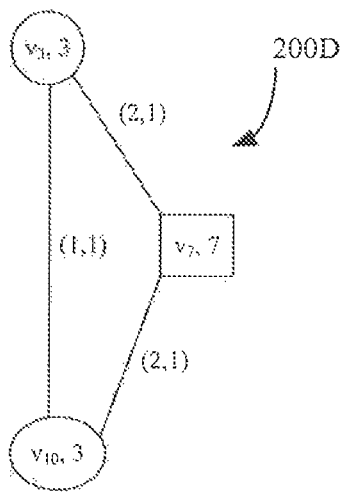
Figure 2E:
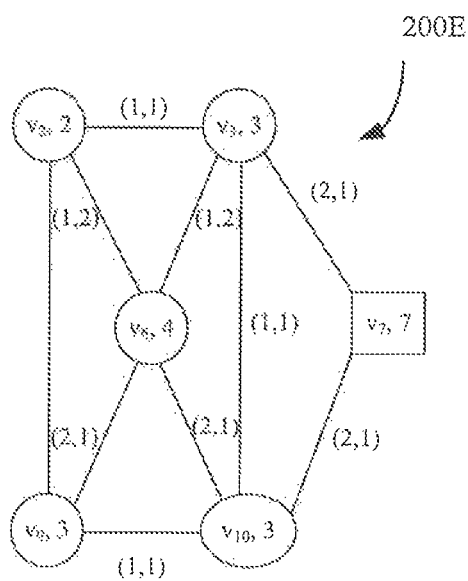

FIGS. 2B and 2C illustrate exit graphs EG (G, $v_4$, 1) 200B and EG (G, $v_4$, 2) 200C, respectively, for the building graph G shown in FIG. 2A. Further, FIGS. 2D and 2E show exit graphs EG (G, $v_7$, 1) 200D and EG (G, v7, 2) 200E, respectively, for the building graph shown in FIG. 2A. Assume IN (EG (G,v,κ)) to denote the set of vertices $v^l$ of EG (G, v,κ) such that the minimum number of edges between vl and exit v equals κ. For instance, IN (EG (G, $v_4$, 1))={$v_5$}, IN (EG (G, $v_4$, 2))={$v_1$, $v_8$}, IN (EG (G, $v_7$, 1))={$v_3$, $v_{10}$}, and IN (EG (G, $v_7$, 2))={$v_2$, $v_6$, $v_9$}. The vertices in IN (G, v,κ) are referred to as the entry vertices of EG (G, v, κ). In an example, given $F_\beta$ and an exit graph EG(G, v, κ), the projection $\Pi_{EG(G,v,\kappa)}(F_\beta)$ consists of a) the inequalities $Y_i=f_i(X)$ (with i∈[1 ... k]) of $F_\beta$ using only the x's variables of LPS*(EG(G,v,κ)) and the y's variables of $LPW^i(EG(G,v,\kappa))$, as well as constants;

b) the inequalities $\alpha_i=f_i'(X)$ (with i∈[1 ... k]) of $F_\beta$ using only the variables of LPS*(EG(G,v,κ)) and constants, when the variable $\alpha_i$ only depends on variables not belonging to LPS*(EG(G,v,κ)) the remaining variables are normalized to 1;

c) $\Sigma_{i=1}^k \alpha_i = 1$; and d) $\alpha_i \geq 0$, $\forall i \in [1 \ldots k]$.

In an example implementation, an evacuation path is planned based on the behavior model. In this example implementation, a copy GI of the input building graph, an SES es to be returned initially set to the initial state for each time point, a variable time U (v) for each temporary exit vertex v representing the amount of time used to evacuate people from v (initially set to 0 for the exists of G) are received. In this example, vertices v∈tempEX are ordered in ascending order of timeU (v). Initially, tempEX contains the exits of the input building graph, then is updated using the entry vertices of the exit graphs processed. Further, nextEX represents the set of temporary exits that may be processed at subsequent iteration. At each iteration, a temporary exit v is extracted from tempEX. After finding κ≥1 such that at least [γ·|IN (EG (G, v, κ))|], entry vertices of EG ($G^l$,v,κ) are occupied by someone, and constructing the exit graph $G^v$=EG ($G^l$,v,κ), the initial state $s_0$ is restricted to the people in $G^v$ by considering that the people on vertex v are those not already evacuated. Next, the projection $F^v = \Pi_{G^v}(F_\beta)$ of the behavior model $F_\beta$ to $G^v$ is computed, and an evacuation problem with reference to the sub-evacuation problem ($G^v$, $s^v$, $F^v$) is solved by finding a solution $\sigma^v$ of IP(($G^v$, $s^v$, $F^v$), D−timeU (v)). Further, the SES $es^v$ corresponding to solution $\sigma^v$ is used to update the SES es being constructed. Let ε ($es^v$) be the time needed to evacuate the people in $G^v$ by $es^v$. Basically, updating es with $es^v$ means (i) using the information provided by $es^v$ to move persons p initially residing on a vertex of $G_v$ towards v during the time period [0 ... ε ($es^v$)], and (ii) using the information provided by es to evacuate p according to an evacuation schedule that allowed to reach an exit starting from vertex v to another person p* that initially was on vertex v (a delay may be introduced to make es consistent with the capacities constraints).

Let es be a SES for G, and let $es^v$ be a SES for $G^v$. The evacuation schedule $es^l$ obtained by updating es with $es^v$ as follows.

$\forall p \in P$ such that $s_0$ (p) is not in $G^v$, and for each time point t∈T, it is the case that $es^l_p$ (t)=$es_p$ (t) (i.e., nothing changes in $es^l$ for people not evacuated by $es^v$).

$\forall p \in P$ such that $s_0(p)$ is in $G^v$, it is the case that $es^l_p(t)_p = es^V_p$ (t) for t∈[0,ε ($es^v$)] (i.e., $es^l$ mimics $es^v$ during the time needed to move p from his initial state to the temporary exit v).

$es^l_p(t)_p = es^V_p$ (ε($es^v$)) for t∈[ε($es^v$), ε($es^v$)+δ], where δ is the minimum delay for which no violation of the capacity constraints occurs (i.e., $es^l$ may require that p waits on the temporary exit v for δ time points).

$es^l_p(t)=es_{p^*}(t-ε(es^v)-δ)$ for t∈[ε($es^v$)+δ, D], where p* is any person such that $s_0(p^*)=v$ and $s_D(p^*) \in EX$.

Upon updating es with $es^v$, variable time U (v) is updated and the building graph $G^l$ is updated by removing the sub graph $G^v$. Next, if timeU (v)>0, the entry vertices of the examined temporary exit v are added to nextEX. These vertices are considered as temporary exits at the next iteration of the repeat loop. Further, variable time U is initialized for each entry vertex of $G^v$. After all temporary exits in tempEX have been examined, a new set tempEX is created by using the entry vertices collected in nextEX, and $G^l$ is consistently updated by adding to it both the vertices in nextEX and edges of G incident on vertices in nextEX. The process ends when all vertices of $G^l$ have been examined and returns SES es incrementally built during its execution.

In an example, consider the building graph G of FIG. 2A where persons residing or a vertex at time 0 are specified beside the vertex, the time interval T with $t_{max}$=10, the deadline D=5, and the delayed behavior model β of 12. Let γ=100%. At the beginning, the priority queue tempEX contains the exits $v_4$ and $v_7$ of G, both having priority given by timeU ($v_4$)=timeU ($v_7$)=0. Assume that the (temporary) exit $v_4$ is extracted. Then, since $v_4$ is not an isolated vertex, κ=2 is computed such that all the entry vertices of $G^{v4}$=EG ($G^l$, $v_4$, 2) (shown in FIG. 2O) are occupied by at least one person at time 0. Next, the restriction of so to the set {$p_1$, $p_4$} of persons residing on a vertex of $G^{v4}$ except on $v_4$ is computed, that is, $s_0$ ($p_1$)=$v_1$ and $s_0$ ($p_4$)=$v_8$. Since timeU ($v_4$)=0 and es coincides with so, according to which none is on $v_4$, and no update of $s^{v4}$ is performed on the basis of the persons on the (temporary) exist $v_4$. After this, the projection $F^{v4}$ of the input delayed behavior model is computed and a SES $es^{v4}$ is computed by solving IP (($G^{v4}$, $s^{v4}$, $F^{v4}$), D−timeU ($v_4$)), where timeU ($v_4$)=0. Let $es^{v4}$ be such that $es_{p1}^{v4}$ and $es_{p4}^{v4}$ is as reported in an example table below. So, es is updated as follows: $es_{p1}=es_{p1}^{v4}$ and $es_{p4}=es_{p4}^{v4}$ and $\forall p$ (P\{$p_1$, $p_4$}), t∈T, $es_p$ (t)=$s_0$ (p).

| Person p | $es_p^{v4}$ p(0) | $es_p^{v4}$ p(1) | $es_p^{v4}$ p(2) | $es_p^{v4}$ p(3) | $es_p^{v4}$ p(4) | $es_p^{v4}$ p(t), 5 ≤ t ≤ $t_{max}$ |
|---|---|---|---|---|---|---|
| $p_1$ | $v_1$ | ($v_1$, $v_5$) | $v_5$ | ($v_5$, $v_4$) | $v_4$ | $v_4$ |
| $p_4$ | $v_8$ | ($v_8$, $v_5$) | $v_5$ | ($v_5$, $v_4$) | $v_4$ | $v_4$ |

Next variable timeU ($v_4$) is set to 4, and the copy $G^l$ of G is updated by removing all the vertices of $G^{v4}$ and the edges incident with the vertices (hence $G^l$ have the shape of the graph in FIG. 2E). Further, D−timeU ($v_4$)=1>0), and variable nextEx is set to {$v^1$, $v_8$}, and timeU ($v_1$) and timeU ($v_8$) are assigned with 4.

At the second iteration, the (temporary) exit $v_7 \in$ tempEX is considered. Since each entry vertices of $G^{v7}$=EG ($G^l$, $v_7$, 1) (shown in FIG. 2D) contains some person, $G^{v7}$ is processed and a SES $es^{v7}$ is computed by solving IP (($G^{v7}$, $s^{v7}$, $F^{v7}$), D−timeU ($v_7$)), where timeU ($v_7$)=0. Let $es^{v7}$ be such that $es_{p3}^{v7}(0)=v_3$, and $es_{p3}^{v7}(t)=v_7$ for $t\geq 1$, $es_{p7}^{v7}(0)=v_{10}$, and $es_{p7}^{v7}(t)=v_7$ for $t\geq 1$. Thus, es is updated as shown in an example table below, where p2, p5, and p6 are residing on the initial vertices yet.

| Person p | $es_p(0)$ | $es_p(1)$ | $es_p(2)$ | $es_p(3)$ | $es_p(4)$ | $es_p^{v4}(t)$, $5 \leq t \leq t_{max}$ |
|---|---|---|---|---|---|---|
| $p_1$ | $v_1$ | $(v_1, v_5)$ | $v_5$ | $(v_5, v_4)$ | $v_4$ | $v_4$ |
| $p_2$ | $v_2$ | $v_2$ | $v_2$ | $v_2$ | $v_2$ | $v_2$ |
| $p_3$ | $v_3$ | $v_7$ | $v_7$ | $v_7$ | $v_7$ | $v_7$ |
| $p_4$ | $v_8$ | $(v_8, v_5)$ | $v_5$ | $(v_5, v_4)$ | $v_4$ | $v_4$ |
| $p_5$ | $v_9$ | $v_9$ | $v_9$ | $v_9$ | $v_9$ | $v_9$ |
| $p_6$ | $v_6$ | $v_6$ | $v_6$ | $v_6$ | $v_6$ | $v_6$ |
| $p_7$ | $v_{10}$ | $v_7$ | $v_7$ | $v_7$ | $v_7$ | $v_7$ |

Further, variable timeU ($v_7$) is set to 1, and the copy $G^I$ of G is updated by removing all the vertices of $G^{v7}$ and the edges incident with them. That is $G^I$ consists of the subgraph containing only vertices $v_2$, $v_6$, and $v_9$ and the edges between these vertices. After this, variable nextEx is update to $\{v_1, v_3, v_8, v_{10}\}$, and time used ($v_3$) and timeU ($v_{10}$) are assigned with 1. Since all the temporary exits in tempEx have been examined, the set nextEX is used to update the priority queue tempEx and the copy $G^I$ of G is updated by adding the vertices in tempEx as well the edges incident with the vertices. Then, a new while loop begins with the priority queue tempEx containing the vertices $v_3$, $v_{10}$, $v_1$, $v_8$ whose ordering is implied by timeU ($v_3$)=timeU ($v_{10}$)=1, timeU ($v_1$)=timeU ($v_8$)=4. Assume that at the first iteration of this loop, the temporary exit $v_3$ is extracted from tempEx. Since the entry vertices $v_2$ and $v_6$ of $G^{v3}$=EG ($G^I$, $v_3$, 1) are occupied by some person, $G^{v3}$ is used for computing a SES. Further, the restriction $s_0^{v3}$ of the initial state $s_0$ over the vertices of $G^{v3}$ except v3 is computed, obtaining $s_0^{v3}$ (p2)= v2 and $s_0^{v3}$ (p6)=v6. Next, as there is no person p∈P such that $es_p$ (1)=v3, $s_0^{v3}$ is not updated to keep track of people residing on the temporary exit $v_3$ and not evacuated yet. Thus, a SES $es^{v3}$ is computed by solving IP (($G^{v3}$, $s^{v3}$, $F^{v3}$), D–timeU ($v_3$)), where time used ($v_3$)=1. Let $es^{v3}$ be such that $es_{p2}^{v3}(0)=v2$, $es_{p2}^{v3}(1)=v3$, and $es_{p6}^{v3}(0)=v6$, $es_{p6}^{v3}(1)=(v6, v3)$, $es_{p6}^{v3}(2)=v3$. Thus, es is updated where (i) $p_2$ after implementing $es_{p2}^{v3}$ follows with no delay the evacuation schedule $es_{p3}$ of $p_3$ that initially was on the temporary exit $v_3$ and reached an exit by the deadline according to es.

| Person p | $es_p(0)$ | $es_p(1)$ | $es_p(2)$ | $es_p(3)$ | $es_p(4)$ | $es_p^{v4}(t)$, $5 \leq t \leq t_{max}$ |
|---|---|---|---|---|---|---|
| $p_1$ | $v_1$ | $(v_1, v_5)$ | $v_5$ | $(v_5, v_4)$ | $v_4$ | $v_4$ |
| $p_2$ | $v_2$ | $v_3$ | $v_7$ | $v_7$ | $v_7$ | $v_7$ |
| $p_3$ | $v_3$ | $v_7$ | $v_7$ | $v_7$ | $v_7$ | $v_7$ |
| $p_4$ | $v_8$ | $(v_8, v_5)$ | $v_5$ | $(v_5, v_4)$ | $v_4$ | $v_4$ |
| $p_5$ | $v_9$ | $v_9$ | $v_9$ | $v_9$ | $v_9$ | $v_9$ |
| $p_6$ | $v_6$ | $v_3$ | $v_3$ | $v_7$ | $v_7$ | $v_7$ |
| $p_7$ | $v_{10}$ | $v_7$ | $v_7$ | $v_7$ | $v_7$ | $v_7$ |

Also, variable timeU ($v_3$) is incremented by 2 (the amount of time needed to $es^{v3}$ to evacuate people in $G^{v3}$ towards $v_3$, thus timeU ($v_3$)=3, and the copy $G^I$ of G is updated by removing all the vertices $v_2$, $v_3$, $v_6$ of $G^{v3}$ and the edges incident with the vertices. Hence, $G^I$ consists of the subgraph containing only vertices v1, v8, v9 and v10. Further, variable nextEx is set to $\{v2, v6\}$, and timeU (v2) and timeU (v6) are assigned with 3.

At the next iteration of the while loop, vertex $v_{10}$ with timeU ($v_{10}$)=1 is extracted from the priority queue, and $G^{v10}$=EG ($G^I$, $v_{10}$, 1) is used for computing a SES $es^{v10}$ by solving IP (($G^{v10}$, $s_0^{v10}$, $F_β^{v10}$), D–timeU ($v_{10}$)). Let $es^{v10}$ be such that $es_{p5}^{v10}(0)=v9$ and $_{esp5v10}(1)=v10$.

Furthermore, timeU ($v_{10}$) is incremented by 1, thus obtaining timeU ($v_{10}$)=2, and the copy $G^I$ of G is updated by removing the vertices $v_9$ and $v_{10}$ of $G^{v10}$, and the edges incident with them. Thus $G^I$ consists of the subgraph containing only the (isolated) vertices $v_1$, $v_8$. Then, set nextEx is augmented with the entry vertex $v_9$ of $G^{v10}$, obtaining nextEx=$\{v_2, v_6, v_9\}$, and timeU ($v_9$) are assigned with 2. During the subsequent iterations of the while loop, only the isolated vertices v1, v8 are extracted from the priority queue tempEX. After the execution of the while loop, the priority queue tempEX is updated with the items v2, v6, v9 2 nextEx. Then, v2, v6, v9 and the edges between the vertices are added to G0 that consists of the isolated vertices v1 and v8. Hence, all the vertices in G0 are temporary exists and the process ends after returning the SES es shown in an example table below.

| Person p | $es_p(0)$ | $es_p(1)$ | $es_p(2)$ | $es_p(3)$ | $es_p(4)$ | $es_p^{v4}(t)$, $5 \leq t \leq t_{max}$ |
|---|---|---|---|---|---|---|
| $p_1$ | $v_1$ | $(v_1, v_5)$ | $v_5$ | $(v_5, v_4)$ | $v_4$ | $v_4$ |
| $p_2$ | $v_2$ | $v_3$ | $v_7$ | $v_7$ | $v_7$ | $v_7$ |
| $p_3$ | $v_3$ | $v_7$ | $v_7$ | $v_7$ | $v_7$ | $v_7$ |
| $p_4$ | $v_8$ | $(v_8, v_5)$ | $v_5$ | $(v_5, v_4)$ | $v_4$ | $v_4$ |
| $p_5$ | $v_9$ | $v_{10}$ | $v_7$ | $v_7$ | $v_7$ | $v_7$ |
| $p_6$ | $v_6$ | $v_3$ | $v_3$ | $v_7$ | $v_7$ | $v_7$ |
| $p_7$ | $v_{10}$ | $v_7$ | $v_7$ | $v_7$ | $v_7$ | $v_7$ |

Figure 3:
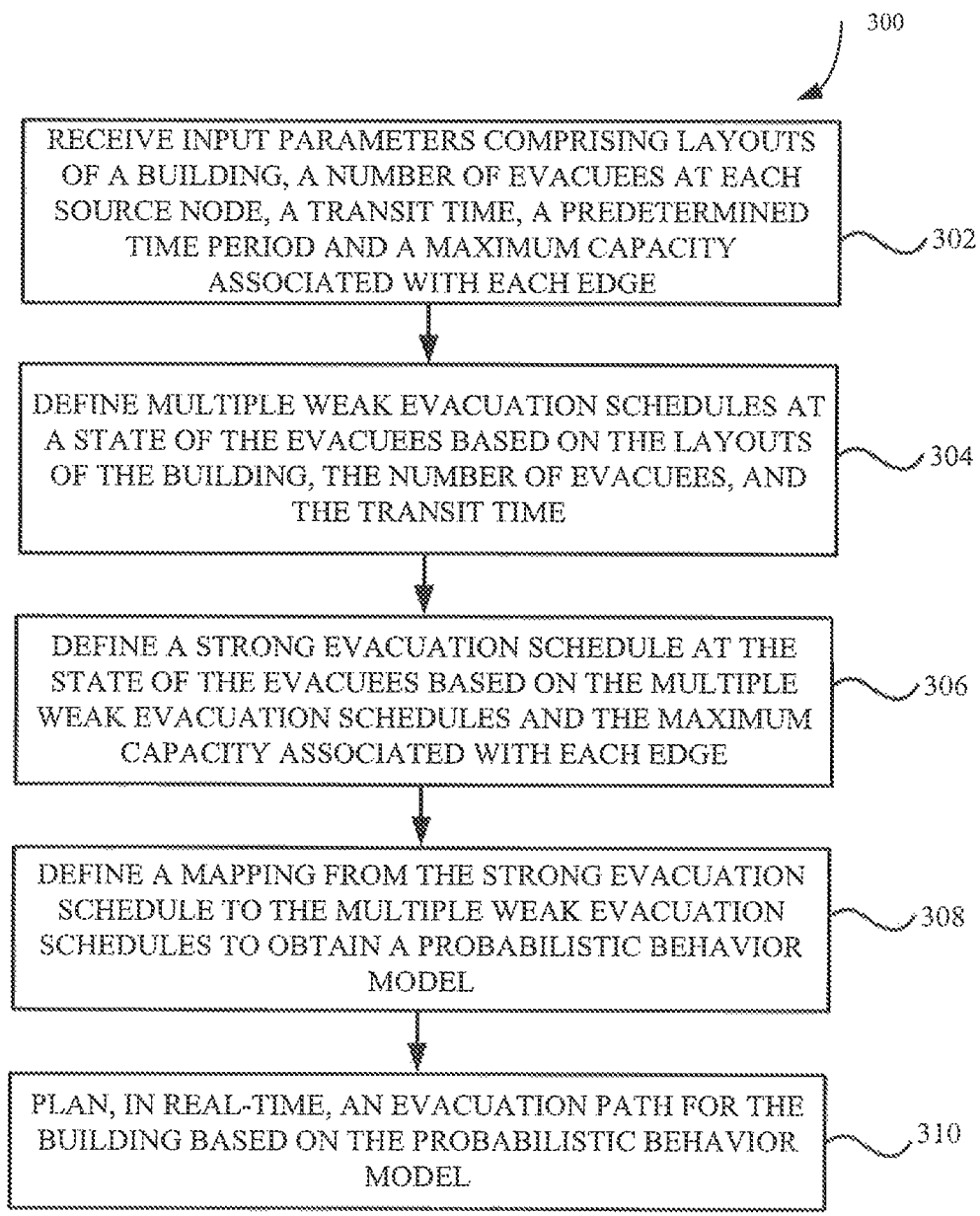
FIG. 3 is a flow chart illustrating a method for planning location-sensitive probabilistic behavior based evacuation paths, according to an embodiment of the present disclosure.

FIG. 3 is a flow chart 300 illustrating a method for planning location-sensitive probabilistic behavior based evacuation paths, according to an embodiment of the present disclosure. In an example embodiment, the flowchart 300 illustrates a method for planning location-sensitive probabilistic behavior based evacuation paths, in a building, from source nodes to sink nodes in a network of routes including a plurality of vertices and edges there between. At block 302, input parameters including layouts of the building, a number of evacuees at each source node, a transit time, a predetermined time period and a maximum capacity associated with each edge and vertex and the like are received. For example, the layouts of the building include floor plans of the building.

At block 304, multiple weak evacuation schedules at a state of the evacuees are defined based on the layouts of the building, the number of evacuees, the transit time and the predetermined time period. The state of the evacuees may be determined, in reap time, based on sensors in the building, global positioning system based mobile phones associated with the evacuees and the like. In an example implementation, an integer linear program is solved on the layouts of the building, the number of evacuees, the transit time and the predetermined time period. Further, the weak evacuation schedules at the state of the evacuees are defined upon solving the integer linear program on the layouts of the building, the number of evacuees, the transit time and the predetermined time period. For example, each of the weak evacuation schedules is an evacuation schedule to evacuate one or more of the evacuees to the sink nodes in a predetermined time period. The predetermined time period includes a deadline to evacuate the evacuees to the sink nodes.

At block 306, a strong evacuation schedule at the state of the evacuees is defined based on the weak evacuation schedules and the maximum capacity associated with each edge and vertex. In an example implementation, an integer linear program is solved on the weak evacuation schedules and the maximum capacity associated with each edge and vertex. Further, the strong evacuation schedule at the state of the evacuees is defined upon solving the integer linear program on the weak evacuation schedules and the maximum capacity associated with each edge and vertex. For example, the strong evacuation schedule is an evacuation schedule to evacuate a plurality of the evacuees to the sink nodes in the predetermined time period.

At block 308, a mapping is defined from the strong evacuation schedule to the multiple weak evacuation schedules to obtain a probabilistic behavior model. For example, the probabilistic behavior model represents constraints associated with behavior of the evacuees. In this example, the probabilistic behavior model includes a delayed behavior model and/or a nearest-exit behavior model. The delayed behavior model may represent delayed behavior of the evacuees following the strong evacuation schedule with multiple probabilities. The nearest-exit behavior model may represent behavior of the evacuees moving towards the nearest exit to the source node where they are located.

At block 310, an evacuation path for the building is planned, in real-time, based on the probabilistic behavior model. The planned evacuation path may represent an evacuation path with a probability distribution over the weak evacuation schedules which provides an expected number of evacuees evacuated when the strong evacuation schedule is provided. In an example, the building is divided into multiple sub-regions. The evacuation path is then planned for each of the multiple sub-regions based on the probabilistic behavior model. The evacuation path for each of the sub-regions is then merged to obtain the evacuation path for the building.

Even though the above evacuation path planning is described with respect to a building, one can envision that the above evacuation path planning can be applicable to any region of interest.

EXPERIMENTAL EVALUATIONA Behavior Based Integer program (BB_IP) and Behavior Based Evacuation Program (BBEP) were implemented on a Deli Precision T7600 server having Intel Xeon E7-4820 CPUs running at 2 GHz with 64 logical processors (8 cores) and 128 GB RAM. The operating system is Ubuntu Linux 4.8.2 64-bit edition. C/C++ network analysis libraries igraph and LEMON were used to implement the algorithms. GNU Linear Programming Kit was used to solve ILP instances.

Real Data: In order to test the algorithms, experiments were performed with the design of an "Ecospace" building, an exemplary facility that was used for experimental purpose. The building hosts approximately 3000 employees and was modeled as a graph with 133 nodes, 200 edges, and 2 exits. For each edge, the distances and capacities were estimated manually in seconds.

Synthetic Data. In addition, experiments were performed with a large number (840) of synthetically generated graphs that were created using the netgen system from the Technical University of Vienna. In order to generate these synthetic graphs, the number of nodes, edges, exits, and people present in the building were simultaneously varied. The number of nodes was varied from 110-200 in steps of 10, the number of edges was varied randomly from 1.35-1.75 times the number of nodes, the population of a building was varied from 500-3500 in steps of approximately 500, and the deadline was varied from 100-225 in steps of 25. Thus for a given number of nodes 84 graphs were generated and the run-time results were averaged. Similarly, 120 graphs for each population size, and 140 graphs for each deadline were generated and the run-time results were averaged. This led to a total of 3360 of evacuation problems that were presented to the system. These instances were analyzed under the Delayed Behavior Model (DBM) and the Nearest Exit Behavior Model (NEBM). The state of a building (i.e., initial distribution of people at time 0) was generated randomly in each instance.

In all the experiments on synthetic data, BB IP was stopped after running for 120 mins and its run time was counted as equal to 120 mins. Moreover, every time BB_IP was stopped it is assumed that it was able to evacuate all people. This was done to account for the several hours that BB IP may otherwise require to finish the run and it may also otherwise not be able to evacuate all people even if it was left to complete the run. The same was done for all experiments on real data except that the cut off time was set to 30 mins.

Figure 7A:
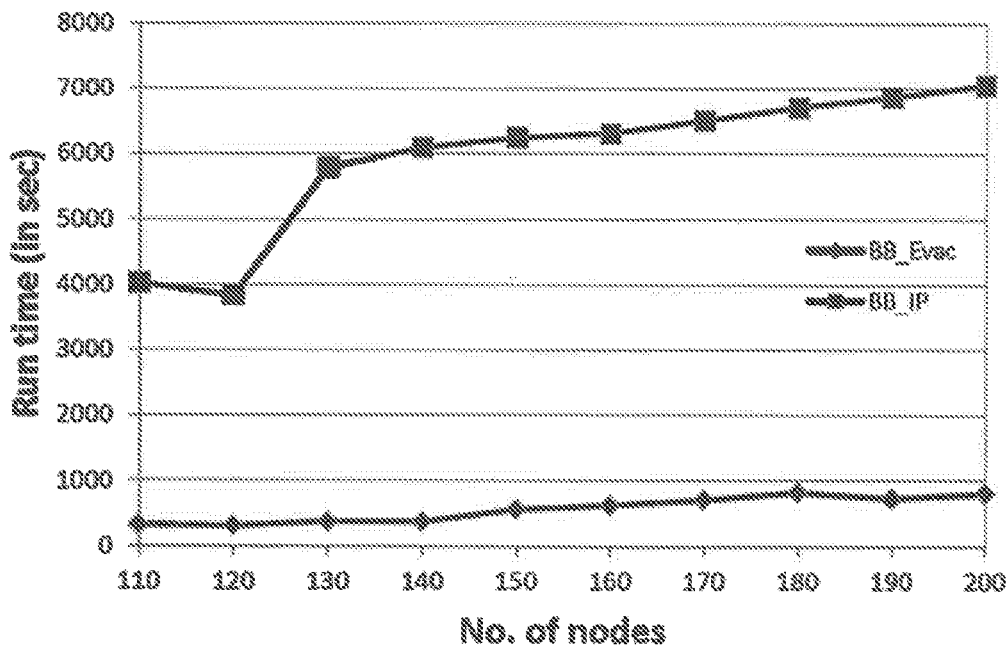
FIG. 7A and FIG. 7B illustrate variation of run time of Behavior Based Integer Program (BB_IP) and Behavior Based Evacuation Program (BBEP) as number of nodes are varied using Delayed Behavior Model (DBM) and Nearest Exit Behavior Model (NEBM) respectively.
Figure 7B:
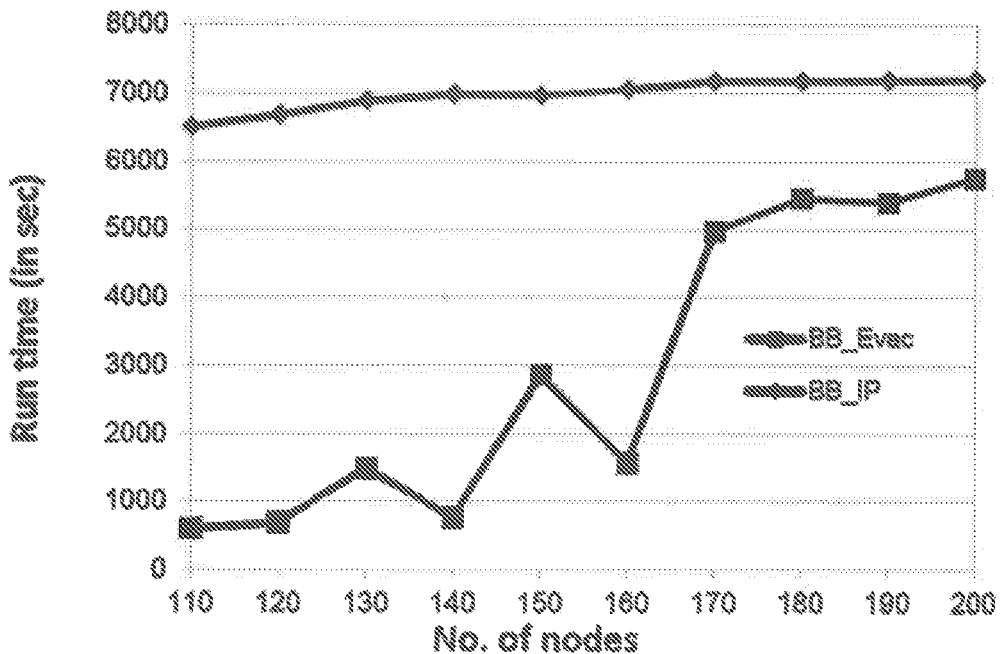

Run time experiment: Varying Number of Nodes (Synthetic Data): FIG. 7A and FIG. 7B illustrate variation of run time of Behavior Based Integer Program (BB_IP) and Behavior Based Evacuation Program (BBEP) as number of nodes are varied using Delayed Behavior Model (DBM) and Nearest Exit Behavior Model (NEBM) respectively. It may be noted that these graphs are plotted by averaging over all experimental instances and so the other factors (e.g. number of edges, deadline etc.) were not held constant. FIG. 7A shows that in the case of DBM, the BB_IP algorithm's performance is much worse than that of BB Evac. BB IP can take about 100 minutes to compute an optimal evacuation plan and more than 50 minutes even in the smallest cases (w.r.t. number of nodes). In contrast, BB Evac takes only 10-20% of the time taken by BB IP. Furthermore, BB Evac takes on average 50 minutes to run, while BB IP was stopped at 120 mins most of the times. When the number of nodes is small (120 or less), BB Evac delivers very high value, running in about 10 minutes as compared to BB IP that can take a couple of hours.

Figure 6A:
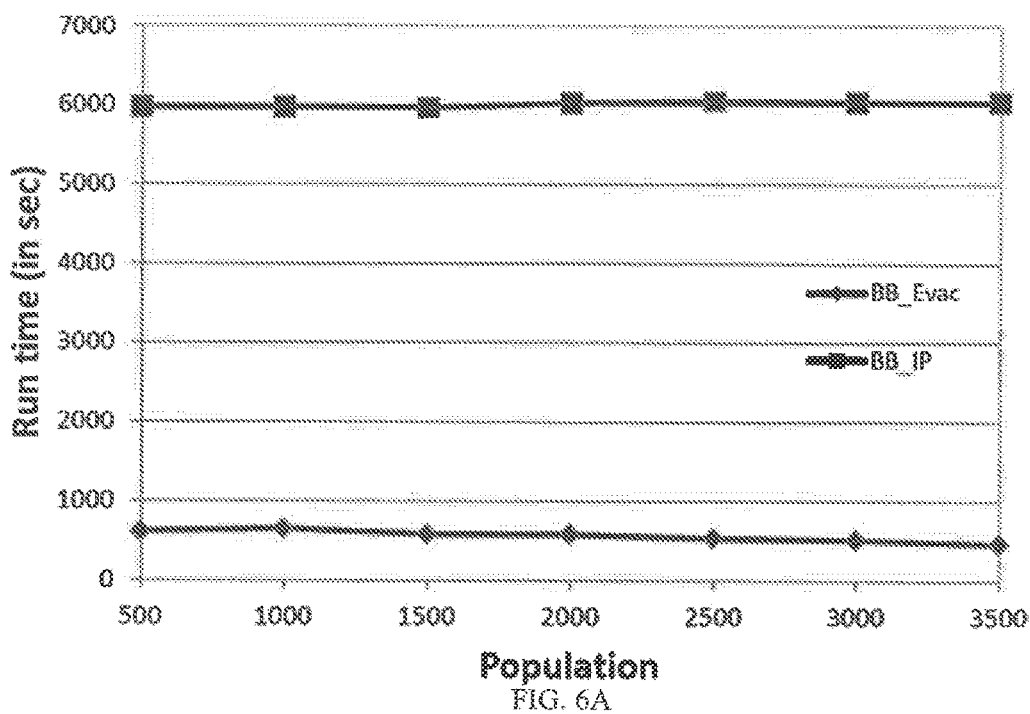
FIG. 6A and FIG. 6B illustrate variation of run time of Behavior Based Integer Program (BB_IP) and Behavior Based Evacuation Program (BBEP) as number of evacuees are varied using Delayed Behavior Model (DBM) and Nearest Exit Behavior Model (NEBM) respectively.
Figure 6B:
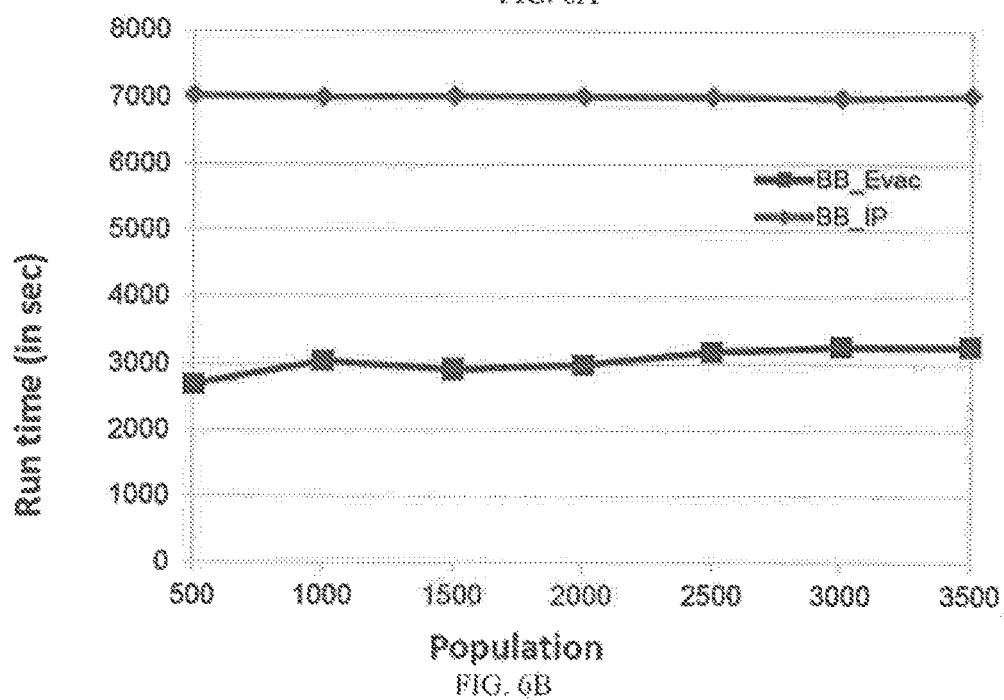

Run time experiment: Varying Number of Evacuees: FIG. 6A and FIG. 6B illustrate variation of run time of Behavior Based Integer Program (BB_IP) and Behavior Based Evacuation Program (BBEP) as number of evacuees are varied using Delayed Behavior Model (DBM) and Nearest Exit Behavior Model (NEBM) respectively. It may be noted that again, these run-times were obtained by averaging over all experimental instances and so the other parameters in the experiments were not held constant, yielding a more realistic view of the run-times. FIG. 6A shows that in the case of the Delayed Behavior Model, the exact BB IP algorithm consistently takes about 100 minutes to run. In contrast, the BB Evac algorithm only takes 8-10 minutes to run, representing an order of magnitude improvement. In the case of the Nearest Exit Behavior Model, the improvement obtained by BB Evac is less: it runs in about ⅓rd of the time taken by BB IP (even if most of the cases the run time of BB IP is the cut off time). This is nonetheless a significant saving in run-time. In both cases (DBM and NEBM), the run-times are relatively constant as the number of evacuees is increased.

Figure 5A:
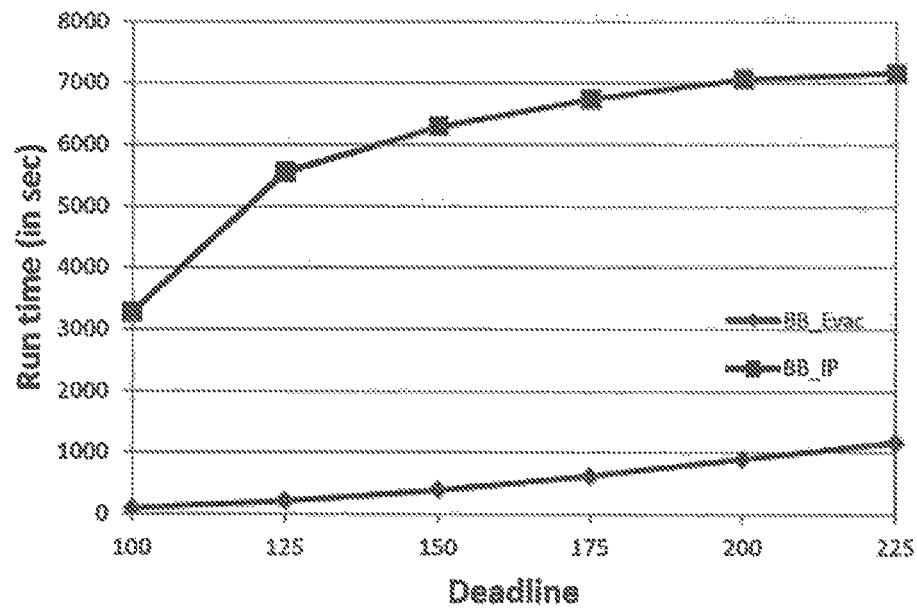
FIG. 5A and FIG. 5B illustrate variation of run time of Behavior Based Integer Program (BB_IP) and Behavior Based Evacuation Program (BBEP) as deadline is varied using Delayed Behavior Model (DBM) and Nearest Exit Behavior Model (NEBM) respectively.
Figure 5B:
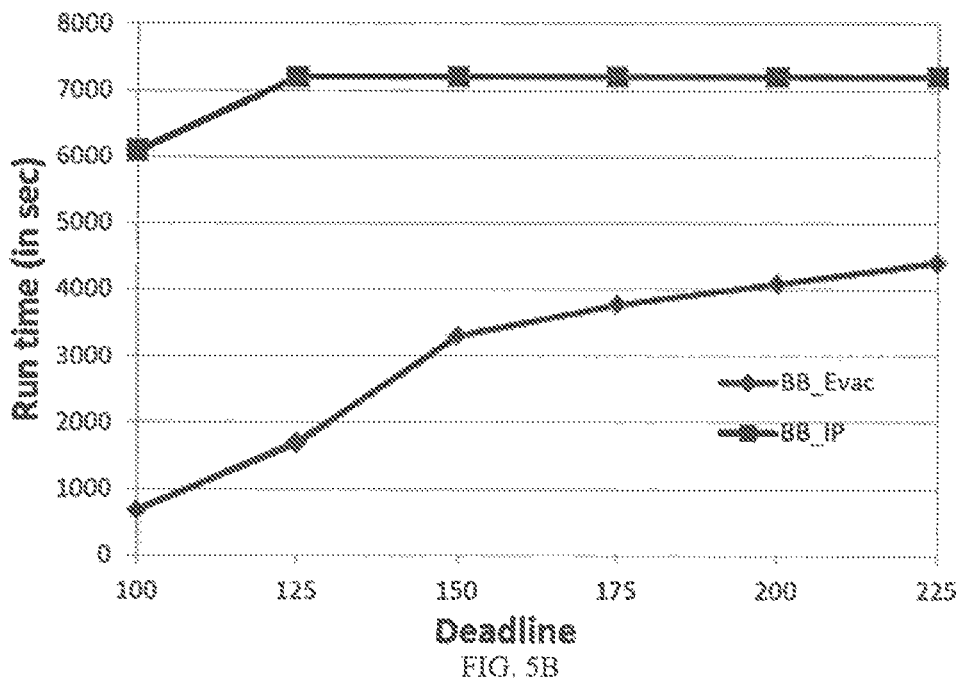

Run time experiment: Varying Evacuation Deadline: FIG. 5A and FIG. 5B illustrate variation of run time of Behavior Based Integer Program (BB_IP) and Behavior Based Evacuation Program (BBEP) as deadline is varied using Delayed Behavior Model (DBM) and Nearest Exit Behavior Model (NEBM) respectively. In particular, FIG. 5A shows that in the case of DBM, the BB IP algorithm's performance is again much worse than that of BB Evac, which takes on average less than 17% of the time taken by BB IP. In the case of NEBM, FIG. 5B shows that most of the times BB IP was stopped at 120 mins, while BB Evac takes on average less than 50 minutes to run.

Figure 8A:
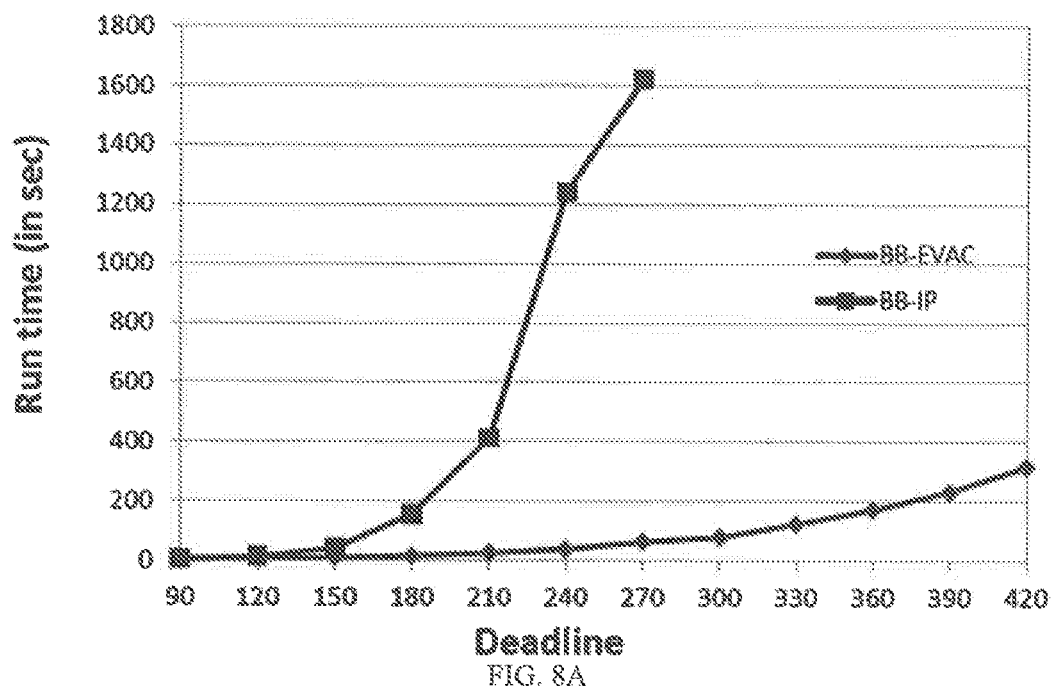
FIG. 8A and FIG. 8B illustrate variation of run time of Behavior Based Integer Program (BB_IP) and Behavior Based Evacuation Program (BBEP) as deadline is varied using Delayed Behavior Model (DBM) and Nearest Exit Behavior Model (NEBM) respectively in real-world EcoSpace building with 3000 evacuees.
Figure 8B:
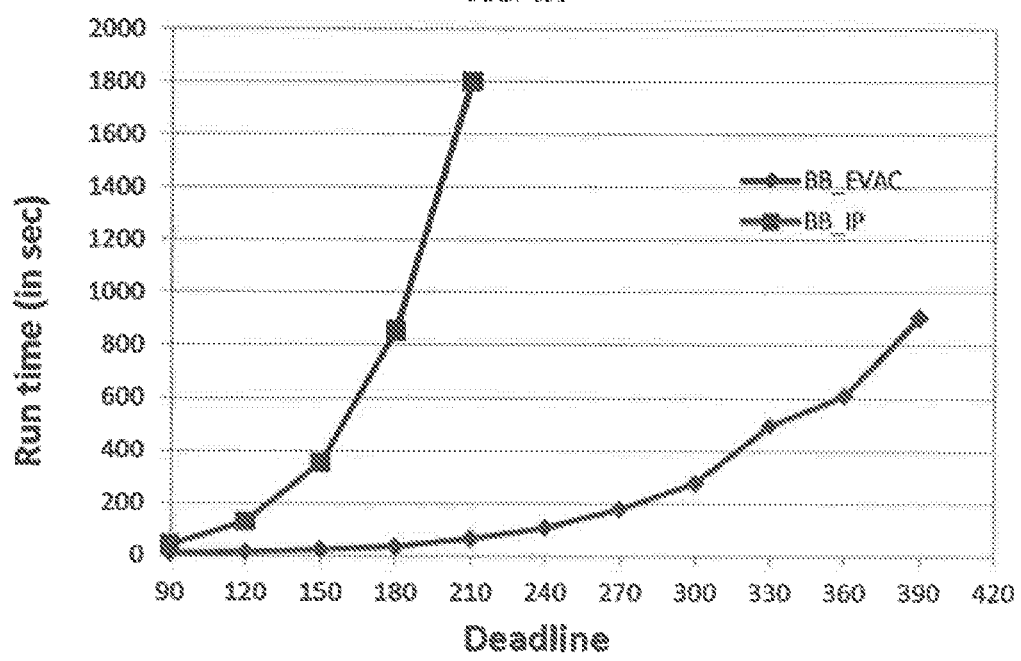

Run time experiment: Run-Time with Real World Building Data: FIG. 8A and FIG. 8B illustrate variation of run time of Behavior Based Integer Program (BB_IP) and Behavior Based Evacuation Program (BBEP) as deadline is varied using Delayed Behavior Model (DBM) and Nearest Exit Behavior Model (NEBM) respectively in real-world EcoSpace building with 3000 evacuees. It may be noted that when the deadline exceeds 270 (resp., 210) seconds, the BB IP algorithm is unable to run within 30 mins of compute time for the Delayed Behavior Model (resp., Nearest Exit Behavior Model). In both the case of the DBM and the NEBM, BB Evac only does slightly better than BB IP. However, it has the advantage of always completing as the deadline increases, whereas BB IP takes inordinate amounts of time.

Quality of Evacuation Schedule: The quality of the evacuation schedule generated by BB Evac as compared to that generated by BB IP was evaluated. The results presented here were derived using the same experimental instances as in the case of the run-time results.

Figure 9A:
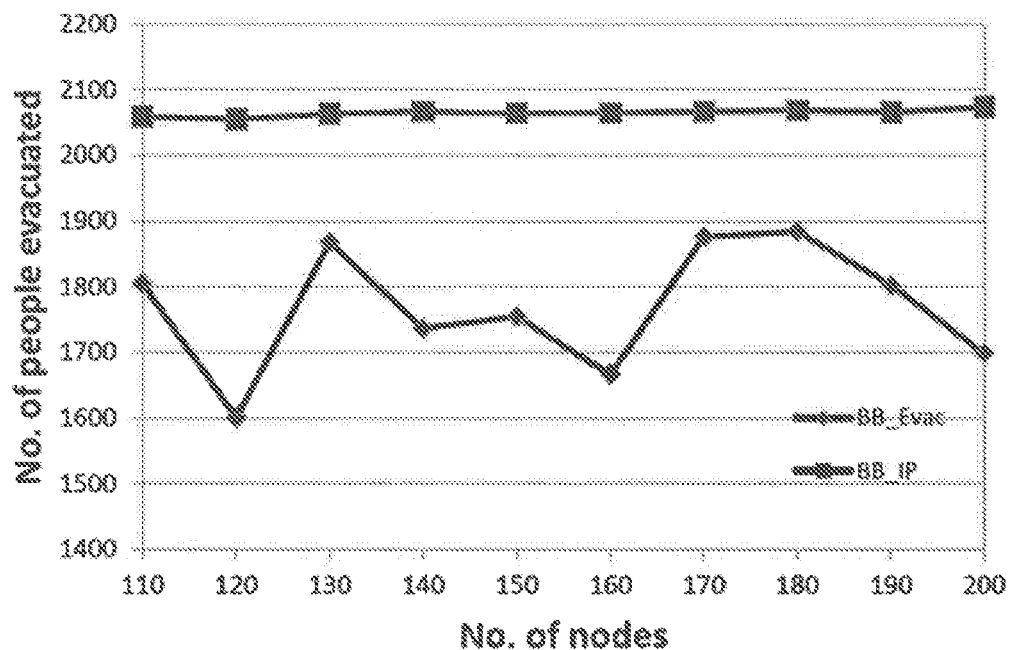
FIG. 9A and FIG. 9B illustrate number of people evacuated in Behavior Based Integer Program (BB_IP) and Behavior Based Evacuation Program (BBEP) as number of nodes is varied using Delayed Behavior Model (DBM) and Nearest Exit Behavior Model (NEBM) respectively.
Figure 9B:
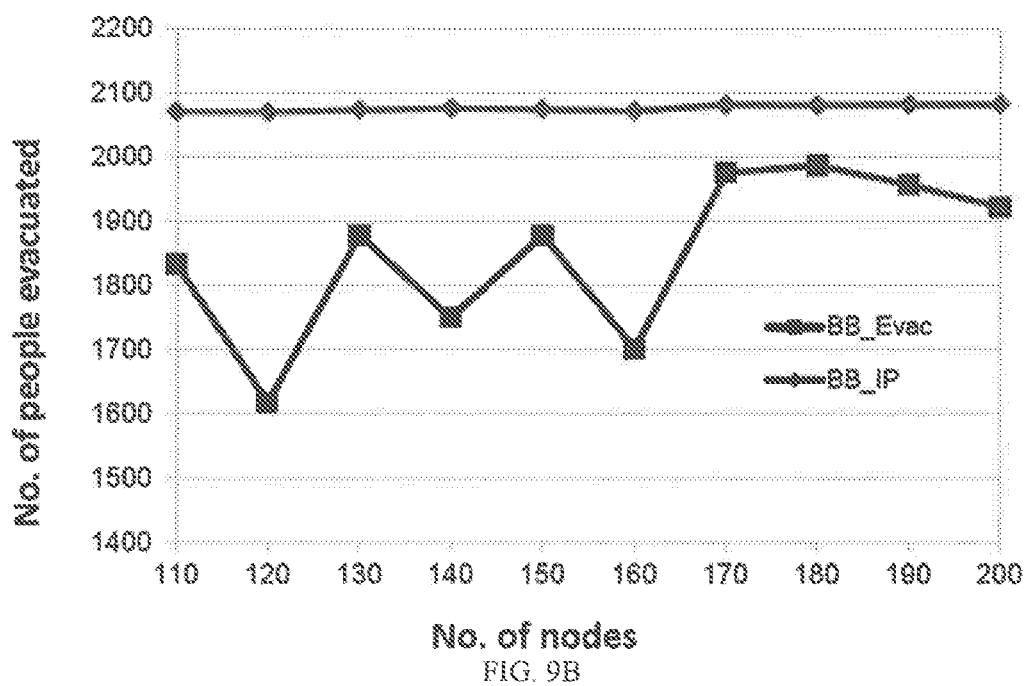

Varying Number of Nodes: FIG. 9A and FIG. 9B illustrate number of people evacuated in Behavior Based Integer Program (BB_IP) and Behavior Based Evacuation Program (BBEP) as number of nodes is varied using Delayed Behavior Model (DBM) and Nearest Exit Behavior Model (NEBM) respectively. When the number of people evacuated by the BB Evac algorithm (irrespective of whether DBM or NEBM is being used) is compared, it is seen that BB Evac evacuates 80-90% of the number of people evacuated by BB IP and that too in a much shorter time period (as shown in previous experiments).

Figure 10A:
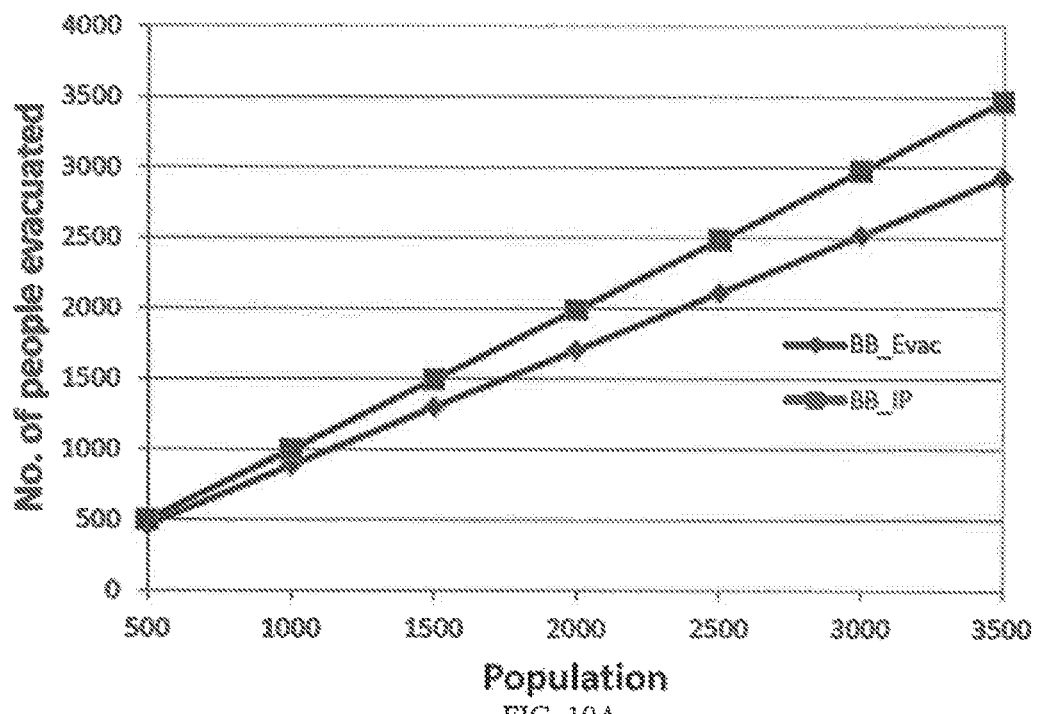
FIG. 10A and FIG. 10B illustrate number of people evacuated in Behavior Based Integer Program (BB_IP) and Behavior Based Evacuation Program (BBEP) as number of evacuees is varied using Delayed Behavior Model (DBM) and Nearest Exit Behavior Model (NEBM) respectively.
Figure 10B:
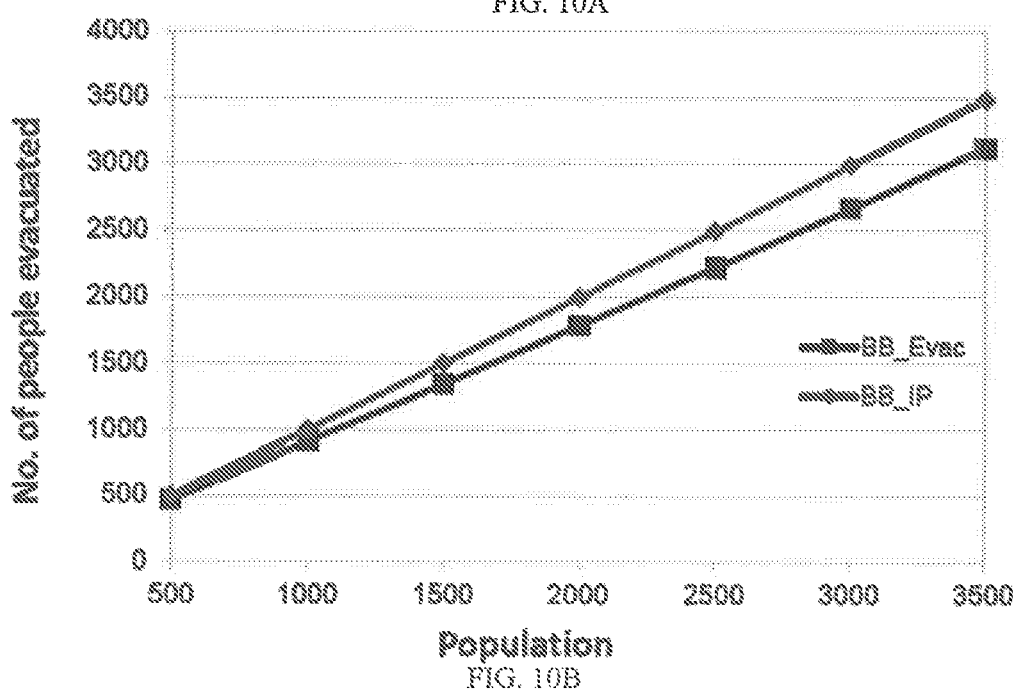

Varying Number of Evacuees: FIG. 10A and FIG. 10B illustrate number of people evacuated in Behavior Based Integer Program (BB_IP) and Behavior Based Evacuation Program (BBEP) as number of evacuees is varied using Delayed Behavior Model (DBM) and Nearest Exit Behavior Model (NEBM) respectively. As in previous experiments, all experimental instances have been reviewed with a certain population size and average over those results—thus, other parameters are not being held constant in order to provide a more realistic view of the situation. In both the cases of DBM and NEBM, it is seen that BB Evac evacuates almost the same number of people as BB IP though this difference increases slightly as the size of the population being evacuated grows larger. But in those cases, BB IP would take much longer to run as compared to BB Evac (as shown in previous experiments), thus significantly mitigating any small benefit obtained by BB IP.

Figure 11A:
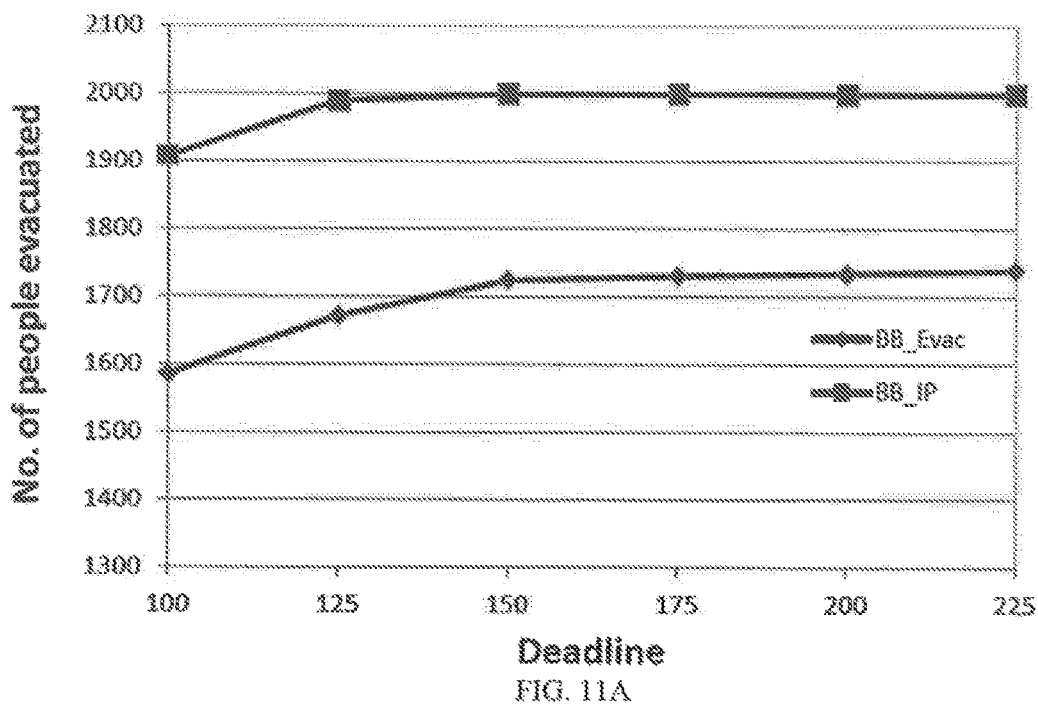
FIG. 11A and FIG. 11B illustrate number of people evacuated in Behavior Based Integer Program (BB_IP) and Behavior Based Evacuation Program (BBEP) as deadline is varied using Delayed Behavior Model (DBM) and Nearest Exit Behavior Model (NEBM) respectively.
Figure 11B:
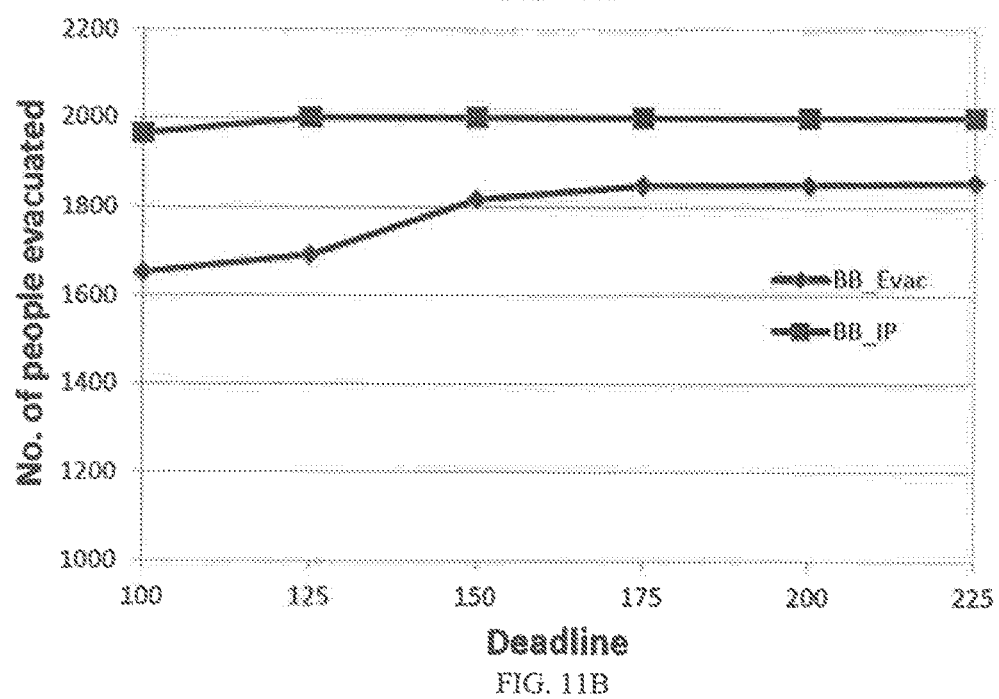

Varying Evacuation Deadline: FIG. 11A and FIG. 11B illustrate number of people evacuated in Behavior Based Integer Program (BB_IP) and Behavior Based Evacuation Program (BBEP) as deadline is varied using Delayed Behavior Model (DBM) and Nearest Exit Behavior Model (NEBM) respectively. Both in the case of the DBM and the NEBM, it is seen that 80-90% of all people that can be evacuated by BB IP are evacuated by BB Evac, but as shown in previous experiments, the time taken to identify an evacuation schedule using BB Evac is much smaller than in the case of BB IP, significantly reducing any advantage that BB IP might hold.

Figure 12A:
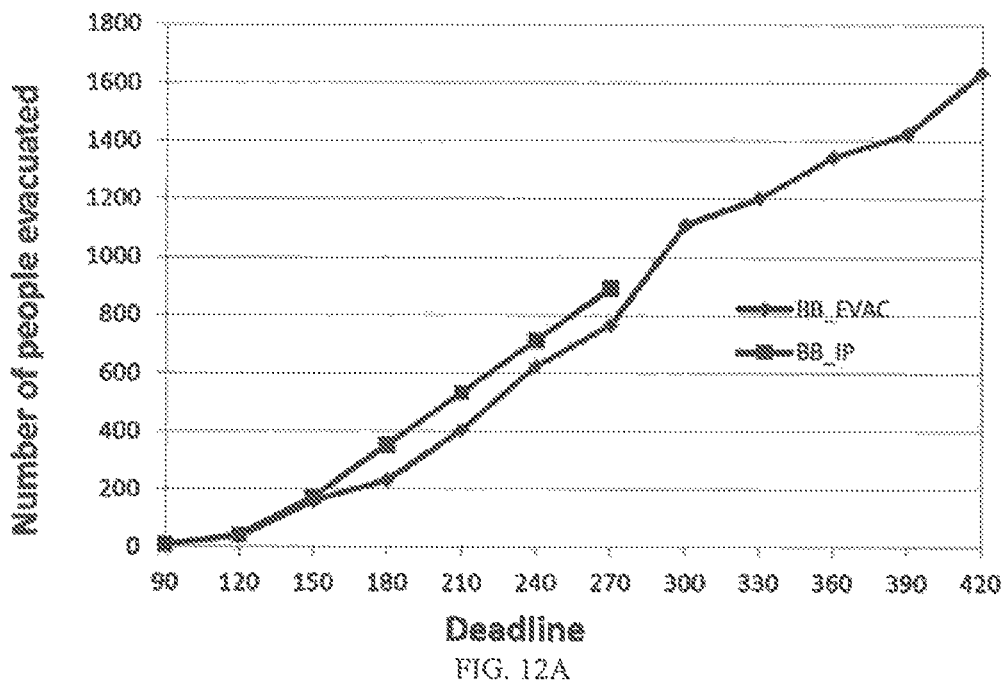
FIG. 12A and FIG. 12B illustrate number of people evacuated in Behavior Based Integer Program (BB_IP) and Behavior Based Evacuation Program (BBEP) as number of nodes is varied using Delayed Behavior Model (DBM) and Nearest Exit Behavior Model (NEBM) respectively in real-world EcoSpace building with 3000 evacuees.
Figure 12B:
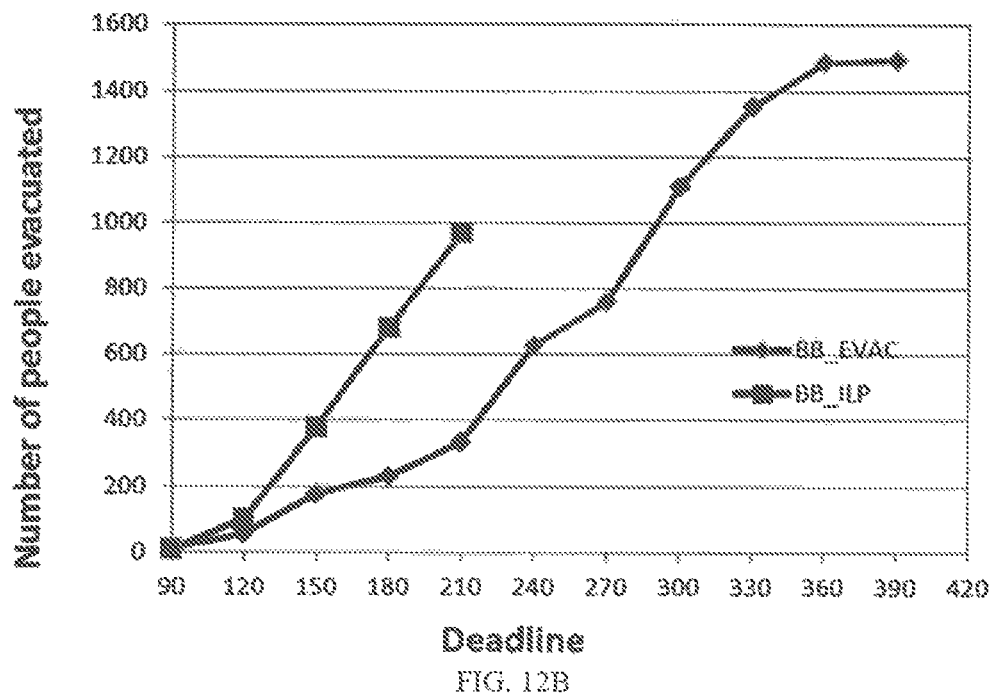

Number of People Evacuated with Real World Building Data: FIG. 12A and FIG. 12B illustrate number of people evacuated in Behavior Based Integer Program (BB_IP) and Behavior Based Evacuation Program (BBEP) as number of nodes is varied using Delayed Behavior Model (DBM) and Nearest Exit Behavior Model (NEBM) respectively in real-world EcoSpace building with 3000 evacuees. In the case of DBM, it is seen that the number of people evacuated by BB Evac is 85% or more of the number evacuated by BB IP (for the deadlines where BB IP was able to finish by the cut off run time). BB Evac does slightly worsen than BB IP in the case of the NEBM. However, it has the advantage of always completing as the deadline increases, whereas BB IP takes inordinate amounts of time.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders, in other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A computer implemented method for planning location-sensitive probabilistic behavior based evacuation paths, in a building, from source nodes to sink nodes in a network of routes comprising a plurality of vertices and edges therebetween, the method comprising:
   receiving input parameters comprising layouts of the building, a number of evacuees at each source node, a transit time, a predetermined time period and a maximum capacity associated with each edge and vertex;
   defining multiple weak evacuation schedules at a state of the evacuees based on the layouts of the building, the number of evacuees, the transit time and the predetermined time period, wherein each of the multiple weak evacuation schedules is an evacuation schedule to evacuate one or more of the evacuees to the sink nodes in the predetermined time period, wherein the predetermined time period includes a deadline to evacuate the evacuees to the sink nodes, and wherein the state of the evacuees corresponds to a mapping of the evacuees with respective location in the vertices and edges to indicate where each evacuee is at a point in time;
   defining a strong evacuation schedule at the state of the evacuees based on the multiple weak evacuation schedules and the maximum capacity associated with the each edge and vertex, wherein the strong evacuation schedule is an evacuation schedule to evacuate a plurality of the evacuees to the sink nodes in the predetermined time period;
   defining a mapping from the strong evacuation schedule to the multiple weak evacuation schedules to obtain a probabilistic behavior model, wherein the probabilistic behavior model is based on at least one of a delayed behavior model and a nearest-exit behavior model to represent constraints associated with behavior of the evacuees, wherein the delayed behavior model represents delayed behavior of the evacuees following the strong evacuation schedule with multiple probabilities and wherein the nearest-exit behavior model represents behavior of the evacuees moving towards the nearest exit to the source node where they are located; and
   planning, in real-time, an evacuation path for the building based on the probabilistic behavior model.

2. The method as claimed in claim 1, wherein the planned evacuation path represents an evacuation path with a probability distribution over the multiple weak evacuation schedules which provides an expected number of evacuees evacuated when the strong evacuation schedule is provided.

3. The method as claimed in claim 1, wherein planning the evacuation path for the building based on the probabilistic behavior model, comprises:
   dividing the building into multiple sub-regions;
   planning the evacuation path for each of the multiple sub-regions based on the probabilistic behavior model; and
   merging the evacuation path for the each of the multiple sub-regions to obtain the evacuation path for the building.

4. The method as claimed in claim 1, wherein the state of the evacuees is determined, in real-time, based on at least one of sensors in the building and global positioning system based mobile phones associated with the evacuees.

5. The method as claimed in claim 1, wherein defining the multiple weak evacuation schedules at the state of the evacuees based on the layouts of the building, the number of evacuees, the transit time and the predetermined time period, comprises:
   solving an integer linear program on the layouts of the building, the number of evacuees, the transit time and the predetermined time period; and
   defining the multiple weak evacuation schedules at the state of the evacuees upon solving the integer linear program on the layouts of the building, the number of evacuees, the transit time and the predetermined time period.

6. The method as claimed in claim 1, wherein defining the strong evacuation schedule at the state of the evacuees based on the multiple weak evacuation schedules and the maximum capacity associated with each edge and vertex, comprises:
   solving an integer linear program on the multiple weak evacuation schedules and the maximum capacity associated with the each edge and vertex; and
   defining the strong evacuation schedule at the state of the evacuees upon solving the integer linear program on the multiple weak evacuation schedules and the maximum capacity associated with the each edge and vertex.

7. A system for planning location-sensitive probabilistic behavior based evacuation paths, in a building, from source nodes to sink nodes in a network of routes comprising a plurality of vertices and edges there between, the system comprising:
   at least one processor; and
   a memory communicatively coupled to the at least one processor, wherein the memory comprises an evacuation path planning module to:
      receive input parameters comprising layouts of the building, a number of evacuees at each source node, a transit time, a predetermined time period and a maximum capacity associated with each edge and vertex;
      define multiple weak evacuation schedules at a state of the evacuees based on the layouts of the building, the number of evacuees, the transit time and the predetermined time period, wherein each of the multiple weak evacuation schedules is an evacuation schedule to evacuate one or more of the evacuees to the sink nodes in the predetermined time period, wherein the predetermined time period includes a deadline to evacuate the evacuees to the sink nodes, and wherein the state of the evacuees corresponds to a mapping of the evacuees with respective location in the vertices and edges to indicate where each evacuee is at a point in time;

define a strong evacuation schedule at the state of the evacuees based on the multiple weak evacuation schedules and the maximum capacity associated with the each edge and vertex, wherein the strong evacuation schedule is an evacuation schedule to evacuate a plurality of the evacuees to the sink nodes in the predetermined time period;

define a mapping from the strong evacuation schedule to the multiple weak evacuation schedules to obtain a probabilistic behavior model, wherein the probabilistic behavior model is based on at least one of a delayed behavior model and a nearest-exit behavior model to represent constraints associated with behavior of the evacuees, wherein the delayed behavior model represents delayed behavior of the evacuees following the strong evacuation schedule with multiple probabilities and wherein the nearest-exit behavior model represents behavior of the evacuees moving towards the nearest exit to the source node where they are located; and plan, in real-time, an evacuation path for the building based on the probabilistic behavior model.

8. The system as claimed in claim 7, wherein the planned evacuation path represents an evacuation path with a probability distribution over the multiple weak evacuation schedules which provides an expected number of evacuees evacuated when the strong evacuation schedule is provided.

9. The system as claimed in claim 7, wherein the evacuation path planning module is configured to:
divide the building into multiple sub-regions;
plan the evacuation path for each of the multiple sub-regions based on the probabilistic behavior model; and
merge the evacuation path for the each of the multiple sub-regions to obtain the evacuation path for the building.

10. The system as claimed in claim 7, wherein the state of the evacuees is determined, in real-time, based on information received from at least one of sensors in the building and global positioning system based mobile phones associated with the evacuees.

11. The system as claimed in claim 7, wherein the evacuation path planning module is configured to:
solve an integer linear program on the layouts of the building, the number of evacuees, the transit time and the predetermined time period; and
define the multiple weak evacuation schedules at the state of the evacuees upon solving the integer linear program on the layouts of the building, the number of evacuees, the transit time and the predetermined time period.

12. The system as claimed in claim 7, wherein the evacuation path planning module is configured to:
solve an integer linear program on the multiple weak evacuation schedules and the maximum capacity associated with the each edge and vertex; and
define the strong evacuation schedule at the state of the evacuees upon solving the integer linear program on the multiple weak evacuation schedules and the maximum capacity associated with the each edge and vertex.

13. A computer program product comprising a non-transitory computer readable medium having a computer readable program embodied therein, wherein the computer readable program, when executed on a computing device, causes the computing device to:
receive input parameters comprising layouts of the building, a number of evacuees at each source node, a transit time, a predetermined time period and a maximum capacity associated with each edge and vertex;
define multiple weak evacuation schedules at a state of the evacuees based on the layouts of the building, the number of evacuees, the transit time and the predetermined time period, wherein each of the multiple weak evacuation schedules is an evacuation schedule to evacuate one or more of the evacuees to the sink nodes in the predetermined time period, wherein the predetermined time period includes a deadline to evacuate the evacuees to the sink nodes and wherein the state of the evacuees corresponds to a mapping of the evacuees with respective location in the vertices and edges to indicate where each evacuee is at a point in time;
define a strong evacuation schedule at the state of the evacuees based on the multiple weak evacuation schedules and the maximum capacity associated with the each edge and vertex, wherein the strong evacuation schedule is an evacuation schedule to evacuate a plurality of the evacuees to the sink nodes in the predetermined time period;
define a mapping from the strong evacuation schedule to the multiple weak evacuation schedules to obtain a probabilistic behavior model, wherein the probabilistic behavior model is based on at least one of a delayed behavior model and a nearest-exit behavior model to represent constraints associated with behavior of the evacuees, wherein the delayed behavior model represents delayed behavior of the evacuees following the strong evacuation schedule with multiple probabilities and wherein the nearest-exit behavior model represents behavior of the evacuees moving towards the nearest exit to the source node where they are located; and
plan, in real-time, an evacuation path for the building based on the probabilistic behavior model.

* * * * *